(12) United States Patent
Segal et al.

(10) Patent No.: US 10,255,251 B2
(45) Date of Patent: Apr. 9, 2019

(54) SYSTEM AND METHOD FOR PROVIDING AND INTERACTING WITH COORDINATED PRESENTATIONS

(71) Applicant: Touchcast LLC, New York, NY (US)

(72) Inventors: Edo Segal, New York, NY (US);
Daniel Guerrero, Puebla (MX);
Charles Miller, Brooklyn, NY (US);
Mark Piesanen, Brooklyn, NY (US)

(73) Assignee: TOUCHCAST LLC, New York, NY (US)

( * ) Notice: Subject to any disclaimer, the term of this patent is extended or adjusted under 35 U.S.C. 154(b) by 413 days.

(21) Appl. No.: 14/935,052

(22) Filed: Nov. 6, 2015

(65) Prior Publication Data

US 2016/0062962 A1    Mar. 3, 2016

Related U.S. Application Data

(63) Continuation-in-part of application No. 14/833,984, filed on Aug. 24, 2015, now Pat. No. 9,661,256, (Continued)

(51) Int. Cl.
*G06F 3/0484* (2013.01)
*G06F 17/22* (2006.01)
(Continued)

(52) U.S. Cl.
CPC ........ *G06F 17/2235* (2013.01); *G06F 3/0482* (2013.01); *G06F 3/04842* (2013.01);
(Continued)

(58) Field of Classification Search
CPC ............ G06F 3/04842; G06F 17/2247; G06Q 30/0277; H04N 21/25891; H04N 21/4316; H04N 21/4722
See application file for complete search history.

(56) References Cited

U.S. PATENT DOCUMENTS 6,020,931 A  2/2000 Bilbrey et al.
7,577,978 B1  8/2009 Wistendahl et al.
(Continued)

FOREIGN PATENT DOCUMENTS

GB  2 502 986  12/2013
WO  WO 2010/141939  12/2010
(Continued)

*Primary Examiner* — Eric J. Bycer
(74) *Attorney, Agent, or Firm* — Leason Ellis LLP

(57) ABSTRACT

In one or more implementations, programming code is provided to each of a plurality of Internet web site hosts. Connection information is received that represents a web page and/or a user. At least one database is accessed that stores information representing advertising content, audience criteria and/or advertising performance, and a premium publisher, a publisher network, and/or self-serve publishing, and a plurality of electronic coordinated presentations. Information representing one coordinated presentation is selected at least as a function of at least one of the received electronic connection information, the electronic advertiser information and the electronic publisher information, and at least some electronic authored coordinated presentation information is transmitted, that is usable to provide the one coordinated presentation with an Internet web page.

18 Claims, 18 Drawing Sheets

Related U.S. Application Data which is a continuation-in-part of application No. 14/316,536, filed on Jun. 26, 2014, now Pat. No. 9,363,448.

(60) Provisional application No. 62/076,307, filed on Nov. 6, 2014.

(51) Int. Cl.
    *G06Q 30/02*     (2012.01)
    *H04N 21/258*     (2011.01)
    *H04N 21/431*     (2011.01)
    *H04N 21/4722*     (2011.01)
    *H04L 29/06*     (2006.01)
    *G06F 3/0482*     (2013.01)
    *G11B 27/031*     (2006.01)
    *H04N 5/222*     (2006.01)
    *H04N 5/265*     (2006.01)
    *H04N 21/4782*     (2011.01)
    *H04N 21/658*     (2011.01)
    *H04N 21/81*     (2011.01)

(52) U.S. Cl.
    CPC ..... *G06F 17/2247* (2013.01); *G06Q 30/0277* (2013.01); *G11B 27/031* (2013.01); *H04L 65/1069* (2013.01); *H04N 5/2222* (2013.01); *H04N 5/265* (2013.01); *H04N 21/25891* (2013.01); *H04N 21/4316* (2013.01); *H04N 21/4722* (2013.01); *H04N 21/4782* (2013.01); *H04N 21/6582* (2013.01); *H04N 21/812* (2013.01); *H04N 21/8133* (2013.01)

(56) References Cited

U.S. PATENT DOCUMENTS

| | | |
|---|---|---|
| 8,508,614 B2 | 8/2013 | Segal |
| 8,584,164 B2 | 11/2013 | Walter et al. |
| 8,745,657 B2 | 6/2014 | Chalozin et al. |
| 9,036,043 B2 | 5/2015 | Segal |
| 9,363,448 B2 | 6/2016 | Segal |
| 9,661,256 B2 | 5/2017 | Segal |
| 2001/0006382 A1 | 7/2001 | Sevat |
| 2002/0186233 A1 | 12/2002 | Holtz et al. |
| 2004/0015398 A1* | 1/2004 | Hayward ............... G06Q 30/02 705/14.49 |
| 2005/0137958 A1 | 6/2005 | Huber et al. |
| 2005/0204438 A1 | 9/2005 | Wang |
| 2006/0075668 A1 | 4/2006 | Sauer |
| 2007/0089134 A1* | 4/2007 | Stearns ............... G06Q 30/02 725/42 |
| 2007/0266322 A1* | 11/2007 | Tretter ............... G11B 27/105 715/716 |
| 2008/0033806 A1* | 2/2008 | Howe ............... G06Q 30/02 705/14.54 |
| 2008/0096175 A1 | 4/2008 | Du Toit et al. |
| 2008/0109300 A1* | 5/2008 | Bason ............... G06Q 30/02 705/14.73 |
| 2008/0150913 A1 | 6/2008 | Bell et al. |
| 2009/0066690 A1 | 3/2009 | Harrison |
| 2009/0153804 A1 | 6/2009 | Giraldo et al. |
| 2009/0237565 A1 | 9/2009 | Staker et al. |
| 2010/0083191 A1 | 4/2010 | Marshall |
| 2010/0174783 A1 | 7/2010 | Zarom |
| 2011/0161990 A1* | 6/2011 | Smith ............... G06F 17/30861 719/328 |
| 2011/0202827 A1 | 8/2011 | Freishtat |
| 2011/0249075 A1 | 10/2011 | Abuan et al. |
| 2011/0254912 A1 | 10/2011 | Mock et al. |
| 2011/0298935 A1 | 12/2011 | Segal |
| 2012/0158524 A1* | 6/2012 | Hintz ............... G06Q 30/0277 705/14.73 |
| 2013/0031593 A1* | 1/2013 | Booth ............... H04N 21/4314 725/110 |
| 2013/0073985 A1 | 3/2013 | Hamlin et al. |
| 2013/0155187 A1 | 6/2013 | Skyberg |
| 2013/0173355 A1 | 7/2013 | Barcenas |
| 2013/0177129 A1* | 7/2013 | Suzuki ............... A61B 6/0457 378/4 |
| 2013/0212615 A1 | 8/2013 | Schultz |
| 2014/0002581 A1 | 1/2014 | Bear et al. |
| 2014/0132702 A1 | 5/2014 | Leibovich et al. |
| 2014/0215542 A1 | 7/2014 | Terpe |
| 2015/0149930 A1 | 5/2015 | Walkin et al. |

FOREIGN PATENT DOCUMENTS

| | | |
|---|---|---|
| WO | WO 2012/139082 | 10/2012 |
| WO | WO 2013/076478 | 5/2013 |
| WO | WO 2013/167901 | 11/2013 |

* cited by examiner

BUILD AD USER INTERFACE ic # SYSTEM AND METHOD FOR PROVIDING AND INTERACTING WITH COORDINATED PRESENTATIONS

CROSS-REFERENCE TO RELATED APPLICATION

The present application is based on and claims priority to U.S. Patent Application Ser. No. 62/076,307, filed Nov. 6, 2014, and is a continuation-in-part of U.S. patent application Ser. No. 14/833,984, filed Aug. 24, 2015, which is a continuation-in-part of U.S. patent application Ser. No. 14/316,536, filed Jun. 26, 2014, the entire contents of each of which are incorporated by reference as if expressly set forth in their respective entireties herein.

FIELD

The present application relates, generally, to content presentation and, more particularly, to a system and method for providing and interacting with coordinated presentations.

BACKGROUND

Interactive and supplemental content that has been made available to viewers has been done through a decoupled, separate communication channel. For instance, a producer can provide a separate communication channel with data, a video stream, or both at a URL associated with the broadcast. For example, a television station can have on-air programming and also provide supplemental content available through a website. Apart from sponsoring both sources of information, these communication channels are generally decoupled from one another. In other words, the broadcaster has only an indirect relationship to the viewer with regard to any supplemental content.

The present application addresses this in a system and method in which the broadcaster, who may be an individual using a portable computer device, provides viewers with the ability to launch supplemental content that has been curated by the broadcaster to the topics and information sources chosen by the broadcaster. As such, a more personal and deeper experience can be had by utilizing the present invention.

It is with respect to these and other considerations that the disclosure made herein is presented.

BRIEF SUMMARY OF THE INVENTION

Disclosed a system and method for providing a plurality of coordinated presentations. In one or more implementations, a system and method provide a selectable and integrable media format within an Internet web page. At least some programming code is provided by at least one processor to each of a plurality of computing devices that are configured as Internet web site hosts, and that integrate the at least some programming code as source code of a plurality of Internet web pages. In response to at least one computing device executing the at least some programming code by establishing a connection with at least one of the Internet web pages, electronic connection information is received by the at least one processor. The electronic connection information represents the at least one of the Internet web pages and/or a user of the at least one computing device executing the at least some programming code.

Moreover, in one or more implementations, the at least one processor accesses at least one database that includes electronic advertiser information that represents at least one of context of advertising content, audience criteria and advertising performance. The at least one database further includes electronic publisher information that represents at least one of a premium publisher, a publisher network, and self-serve publishing. The at least one database further includes electronic authored coordinated presentation information that is associated with a plurality of electronic coordinated presentations. Each of the electronic coordinated presentations comprises at least a first display portion configured to play first video content and a plurality of display units that each provide a link to other respective video content, wherein selection of any of the links in the display units results in corresponding video to play in the respective display unit while the first video content continues to play.

Further, in one or more implementations, the at least one processor selects, at least as a function of at least one of i) the received electronic connection information, ii) the electronic advertiser information and iii) the electronic publisher information, at least some of the electronic authored coordinated presentation information representing one of the electronic coordinated presentations. The at least one processor transmits to the at least one computing device executing the at least some programming code and/or another computing device, at least some of the selected electronic authored coordinated presentation information. The transmitted electronic authored coordinated presentation information is usable to provide the one of the electronic coordinated presentations with the at least one Internet web page on the at least one computing device executing the at least some programming code.

These and other aspects, features, and advantages of the invention can be understood with reference to the following detailed description of certain embodiments of the invention taken together in conjunction with the accompanying drawing figures.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION

Figure 1:
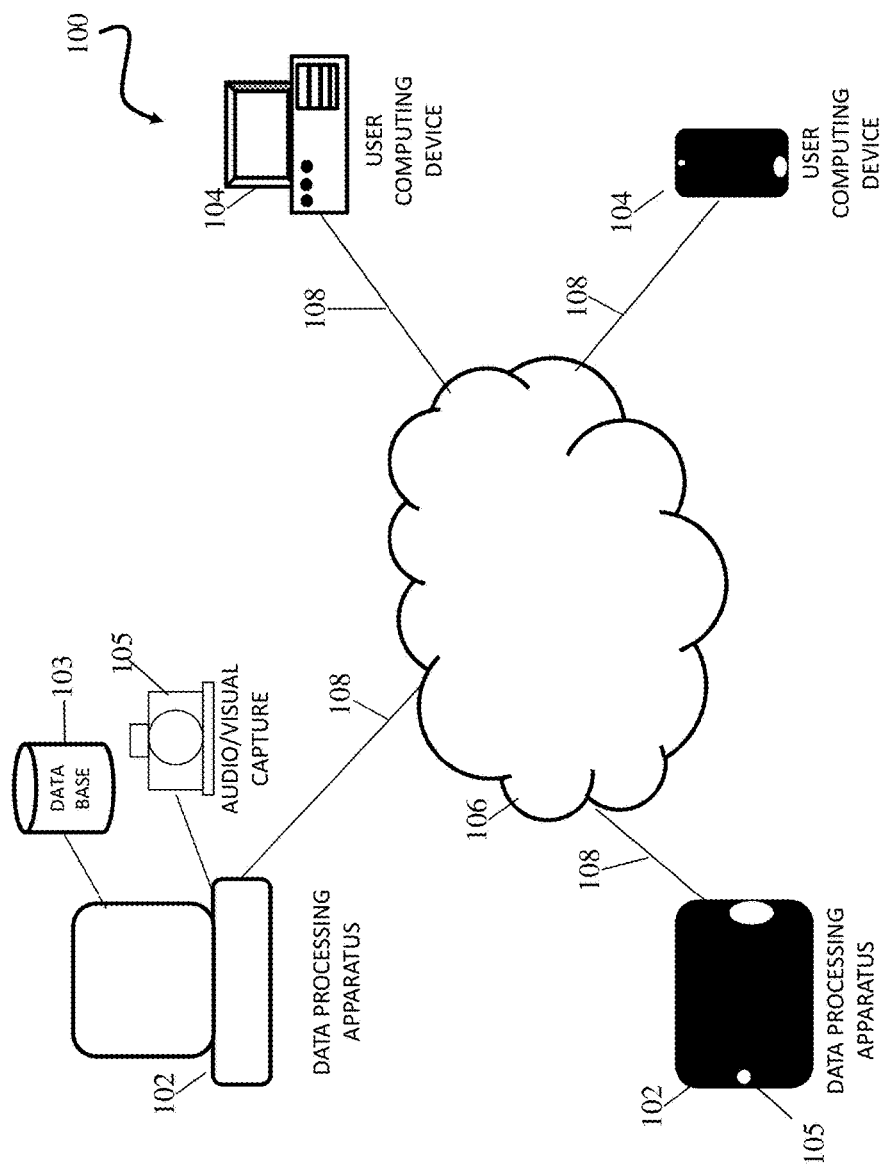
FIG. 1 is a diagram illustrating an example hardware arrangement that operates for providing the systems and methods disclosed herein, in connection with an example implementation.

By way of introduction and overview, in one or more implementations, the present application provides systems and methods for authoring and playing video that can be layered with interactive content, including content that is available over one or more data communication networks, such as the Internet. Devices operating, for example, iOS, ANDROID, WINDOWS MOBILE, BLACKBERRY, MAC OS, WINDOWS or other operating systems are configured to provide functionality, such as an authoring tool and interface for developing distributable coordinated presentations, including videos that include customizable and interactive features for use by one or more end-users that receive the videos. Further, the software applications provide a viewing/interactive tool, referred to herein, generally, as a "consuming" interface for end-users who receive videos that are authored in accordance with the present application. Using the client interface, users may interact with videos as a function of touch and gestures, as well as other suitable interfaces, such as a mouse, trackball, keyboard or other input. Some functionality available for end-users is defined by an author.

The present application includes and improves upon functionality associated with providing advertising video content and other content in respective separately and independently controllable portions of a display screen. For example, the present application provides content in a content unit set forth in a first portion of a display, whereby the content is received from a first computing device. Further, an independently controllable display unit can be provided in a second separate portion of the display. The display unit is configured to include interactive media content and further configured to enable interaction with the interactive media content at each of a plurality of remote devices. Results of a respective interaction at a particular remote device is viewable or otherwise presented at the particular remote device, but not viewable or otherwise presented at other of the remote devices.

In one or more implementations of the present patent application, a processor configured with code processes information representing a selection event that occurred in the display unit. For example, a user clicks his or her mouse in a portion of the display unit while the interactive media content in the display unit is provided therein. The processing that occurs can be to determine at least a relative time and location of the selection event that occurred in the second portion of the display. The information representing the selection event can be stored in one or more databases that are accessible to at least one computing device. The stored information can be used to develop analytics vis-à-vis historical representations of user activity. Furthermore, the selection of an item can be processed to enable the interaction with at least a portion of the interactive media content at one of the remote devices associated with the selection event. This enables results of a respective interaction associated with the selection event to be viewable or otherwise provided at one particular remote device, but not viewable or otherwise provided at other of the remote devices.

Furthermore, in one or more implementations the interactive media content can be configured as an advertisement. The display unit may be configured to include an ad unit that includes a player tool that can be integrated or otherwise "wrapped" within source code of an Internet website or other application. The ad unit can also include the interactive media content that is played by the player device within the display unit.

In one or more implementations, the stored information represents the selection event, such as the relative time of the event and/or a relative location in the display unit, and metrics associated with selection events that occur within the display unit for a plurality of computing devices can be calculated. For example, a plurality of individual users make selections within the display unit on their respective devices, and information associated with the respective selection events is stored and used to determine metrics.

In one or more implementations, a user interface is provided that identifies or includes a graphical representation of metrics that are determined as a function of the stored information representing the respective selection events. For example, interactive media content can be played back for viewing and graphical representations of user activity can overlay the interactive media content as it plays. This can provide, substantially in real-time as the playback occurs, graphical representations of where and when selection events occurred. This information is particularly useful, for example, for identifying potential strengths and weaknesses in a design of an interactive presentation, in accordance with the present application, and for automatically, substantially automatically, and/or manually revising presentations.

Various embodiments and aspects of the invention(s) will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present application.

Referring to FIG. 1 a diagram is provided of an example hardware arrangement that operates for providing the systems and methods disclosed herein, and designated generally as system 100. System 100 can include one or more data processing apparatuses 102 that are at least communicatively coupled to one or more user computing devices 104 across communication network 106. Data processing apparatuses 102 and user computing devices 104 can include, for example, mobile computing devices such as tablet computing devices, smartphones, personal digital assistants or the like, as well as laptop computers and/or desktop computers. Further, one computing device may be configured as a data processing apparatus 102 and a user computing device 104, depending upon operations be executed at a particular time. In addition, an audio/visual capture device 105 is depicted in FIG. 1, which can be configured with one or more cameras (e.g., front-facing and rear-facing cameras), a microphone, a microprocessor, and a communications module(s) and that is coupled to data processing apparatus 102. The audio/visual capture device 105 can be configured to interface with one or more data processing apparatuses 102 for producing high-quality audio/video content.

With continued reference to FIG. 1, data processing apparatus 102 can be configured to access one or more databases 103 for the present application, including coordinated presentations 300 (FIG. 3), as well as various forms of content including, but not limited to image files, video content, documents, audio/video recordings. Moreover, database(s) 103 can include metadata and various kinds of information relating to publishers and advertisers, which is usable in the creation and/or management of an advertising network. The advertising network can be usable for providing advertising campaigns associated with coordinated presentations 300. It is contemplated that data processing apparatus 102 can access any required databases 103 via communication network 106 or any other communication network to which data processing apparatus 102 has access. Data processing apparatus 102 can communicate with devices comprising databases using any known communication method, including a direct serial, parallel, universal serial bus ("USB") interface, or via a local or wide area network.

User computing devices 104 communicate with data processing apparatuses 102 using data connections 108, which are respectively coupled to communication network 106. Communication network 106 can be any communication network, but is typically the Internet or some other global computer network. Data connections 108 can be any known arrangement for accessing communication network 106, such as the public Internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 104 preferably have the ability to send and receive data across communication network 106, and are equipped with web browsers, software applications, or other means, to provide received data on display devices incorporated therewith. By way of example, user computing device 104 may be personal computers such as Intel Pentium™-class and Intel Core™-class computers or Apple Macintosh™ computers, tablets, smartphones, but are not limited to such computers. Other computing devices which can communicate over a global computer network such as palmtop computers, personal digital assistants (PDAs) and mass-marketed Internet access devices such as WebTV™ can be used. In addition, the hardware arrangement of the present invention is not limited to devices that are physically wired to communication network 106, and that wireless communication can be provided between wireless devices and data processing apparatuses 102. In one or more implementations, the present application provides improved processing techniques to prevent packet loss, to improve handling interruptions in communications, and other issues associated with wireless technology.

According to an embodiment of the present application, user computing device 104 provides user access to data processing apparatus 102 for the purpose of receiving and providing information. The specific functionality provided by system 100, and in particular data processing apparatuses 102, is described in detail below.

System 100 preferably includes software that provides functionality described in greater detail herein, and preferably resides on one or more data processing apparatuses 102 and/or user computing devices 104. One of the functions performed by data processing apparatus 102 is that of operating as a web server and/or a web site host. Data processing apparatuses 102 typically communicate with communication network 106 across a permanent i.e., un-switched data connection 108. Permanent connectivity ensures that access to data processing apparatuses 102 is always available.

Figure 2:
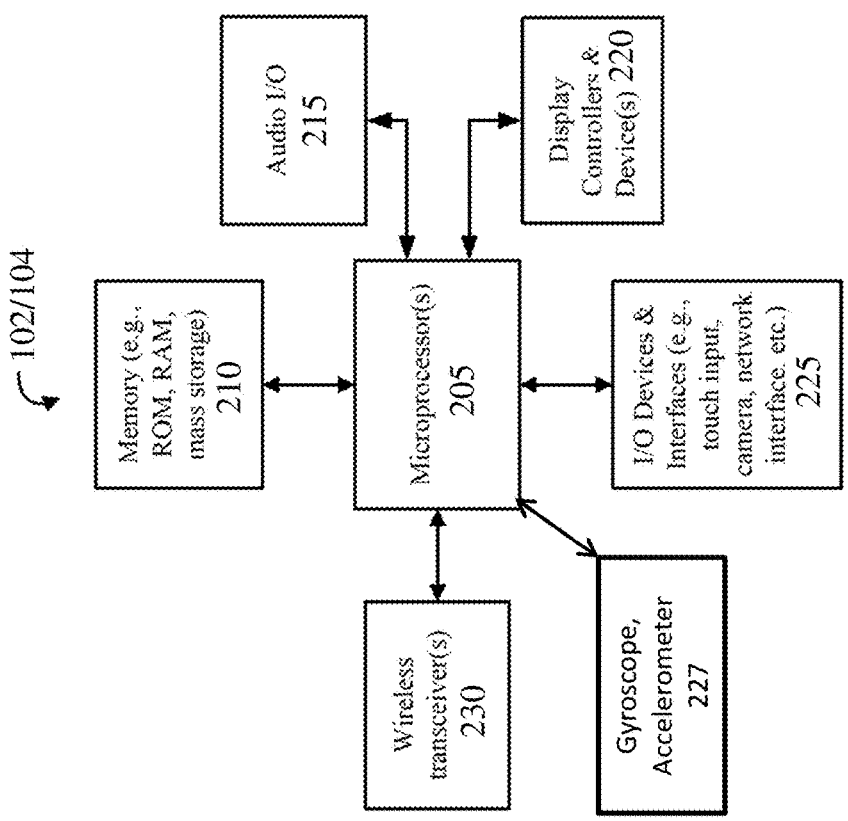
FIG. 2 is a block diagram that illustrates functional elements of a computing device in accordance with an embodiment.

FIG. 2 illustrates, in block diagram form, an exemplary data processing apparatus 102 and/or user computing device 104 that can provide functionality in accordance with interactive conferencing, as described herein. Although not expressly indicated, one or more features shown and described with reference with FIG. 2 can be included with or in the audio/visual capture device 105, as well. Data processing apparatus 102 and/or user computing device 104 may include one or more microprocessors 205 and connected system components (e.g., multiple connected chips) or the data processing apparatus 102 and/or user computing device 104 may be a system on a chip.

The data processing apparatus 102 and/or user computing device 104 includes memory 210 which is coupled to the microprocessor(s) 205. The memory 210 may be used for storing data, metadata, and programs for execution by the microprocessor(s) 205. The memory 210 may include one or more of volatile and non-volatile memories, such as Random Access Memory ("RAM"), Read Only Memory ("ROM"), Flash, Phase Change Memory ("PCM"), or other type.

The data processing apparatus 102 and/or user computing device 104 also includes an audio input/output subsystem 215 which may include a microphone and/or a speaker for, for example, playing back music, providing telephone or voice/video chat functionality through the speaker and microphone, etc.

A display controller and display device 220 provides a visual user interface for the user; this user interface may include a graphical user interface which, for example, is similar to that shown on a Macintosh™ computer when running Mac OS™ operating system software or an iPod™, iPhone™, or similar device when running iOS operating system software.

The data processing apparatus 102 and/or user computing device 104 also includes one or more wireless transceivers 230, such as an IEEE 802.11 transceiver, an infrared transceiver, a Bluetooth™ transceiver, a wireless cellular telephony transceiver (e.g., 1G, 2G, 3G, 4G), or another wireless protocol to connect the data processing system 100 with another device, external component, or a network. In addition, Gyroscope/Accelerometer 235 can be provided It will be appreciated that one or more buses, may be used to interconnect the various modules in the block diagram shown in FIG. 2.

The data processing apparatus 102 and/or user computing device 104 may be a personal computer, tablet-style device, such as an iPod™, a personal digital assistant (PDA), a cellular telephone with PDA-like functionality, such as an iPhone™, a Wi-Fi based telephone, a handheld computer which includes a cellular telephone, a media player, such as an iPod™, an entertainment system, such as a iPod™ touch, or devices which combine aspects or functions of these devices, such as a media player combined with a PDA and a cellular telephone in one device. In other embodiments, the data processing apparatus 102 and/or user computing device 104 may be a network computer or an embedded processing apparatus within another device or consumer electronic product.

The data processing apparatus 102 and/or user computing device 104 also includes one or more input or output ("I/O") devices and interfaces 225 which are provided to allow a user to provide input to, receive output from, and otherwise transfer data to and from the system. These I/O devices may include a mouse, keypad or a keyboard, a touch panel or a multi-touch input panel, camera, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the data processing apparatus 102 and/or user computing device 104. The I/O devices and interfaces 225 may include a connector for a dock or a connector for a USB interface, FireWire', etc. to connect the system 100 with another device, external component, or a network. Moreover, the I/O devices and interfaces can include gyroscope and/or accelerometer 227, which can be configured to detect 3-axis angular acceleration around the X, Y and Z axes, enabling precise calculation, for example, of yaw, pitch, and roll. The gyroscope and/or accelerometer 227 can be configured as a sensor that detects acceleration, shake, vibration shock, or fall of a device 102/104, for example, by detecting linear acceleration along one of three axes (X, Y and Z). The gyroscope can work in conjunction with the accelerometer, to provide detailed and precise information about the device's axial movement in space. More particularly, the 3 axes of the gyroscope combined with the 3 axes of the accelerometer enable the device to recognize approximately how far, fast, and in which direction it has moved to generate telemetry information associated therewith, and that is processed to generate coordinated presentations, such as shown and described herein.

It will be appreciated that additional components, not shown, may also be part of the data processing apparatus 102 and/or user computing device 104, and, in certain embodiments, fewer components than that shown in FIG. 2 may also be used in data processing apparatus 102 and/or user computing device 104. It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 210 or other machine-readable storage medium. The software may further be transmitted or received over a network (not shown) via a network interface device 225. In various embodiments, hardwired circuitry may be used in combination with the software instructions to implement the present embodiments. Thus, the techniques are not limited to any specific combination of hardware circuitry and software, or to any particular source for the instructions executed by the data processing apparatus 102 and/or user computing device 104.

FIGS. 3-8 illustrate a series of display screens provided in accordance with an implementation of the present patent application.

Figure 3:
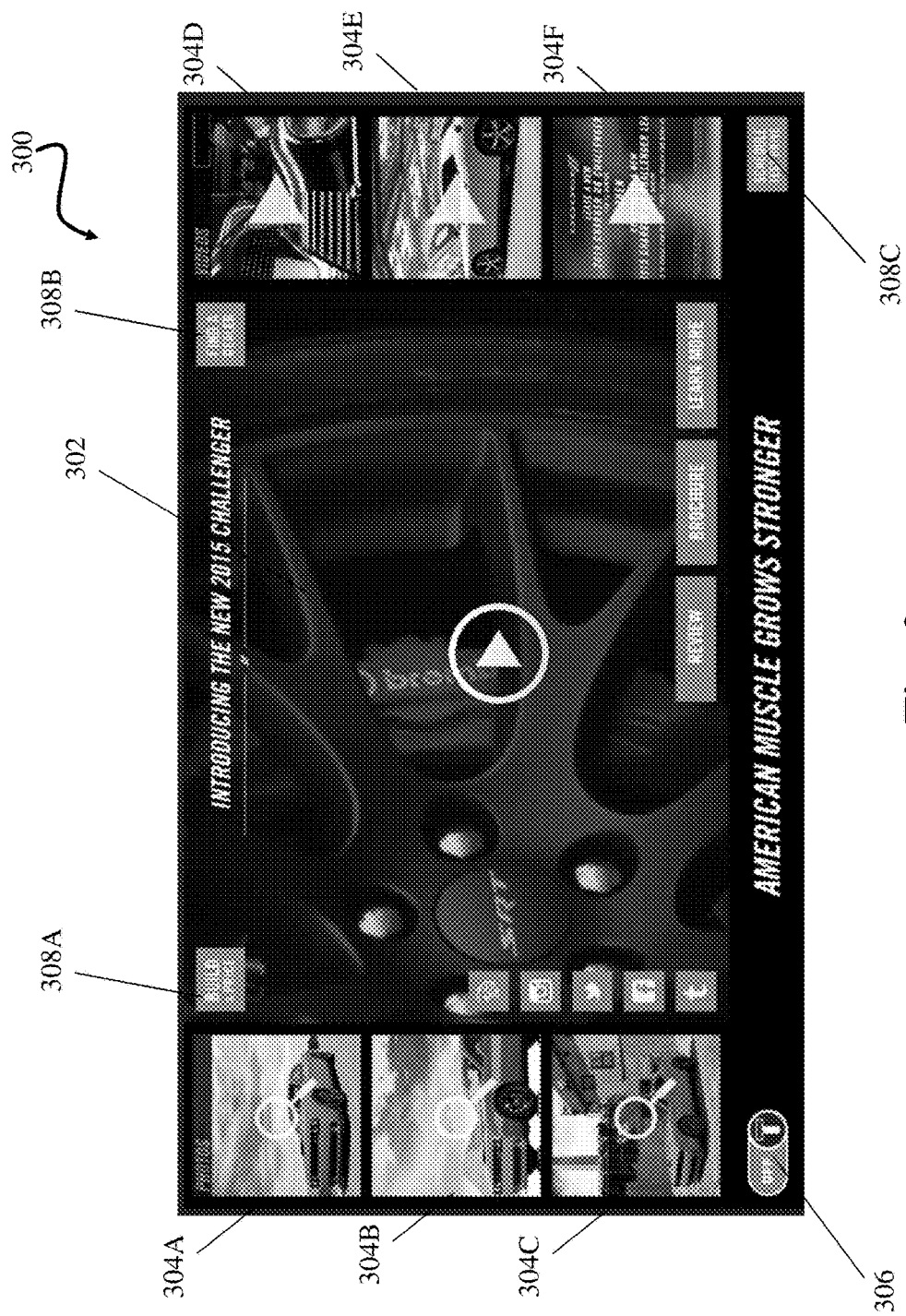
FIG. 3 illustrates an example coordinated presentation that identifies a plurality of interactive portions of a display screen, in accordance with an implementation.

FIG. 3 illustrates an example coordinated presentation 300 that is directed to advertisement content and functionality, includes a plurality of interactive components that improve user engagement. Referred to herein, generally, as a "TouchAd™," the example coordinated presentation 300 includes a first portion 302 of the display screen and that includes content received from a first user computing device 104. Also included in presentation 300 are a plurality of display units 304A-304F that are independently controllable and that include interactive media content. The media content in the display units 304A-304F can include proprietary playing devices or tools that are configured to enable interaction with the interactive media content at each of a plurality of remote devices. For example, display units 304A-304F can include vApps, substantially as shown and described in co-pending and commonly assigned patent application Ser. No. 14/316,536. In this way, when a user interacts with a coordinated presentation, hypertext markup language ("HTML") (or other suitable content) may be served from the host server. This enables a fully (or at least partially) interactive platform. In each of the respective display units 304 that are shown in FIG. 3 interactive media content is provided in the form of videos, and each of the respective videos can play simultaneously and independently within each of the respective display units 304A-304F, while the content provided in portion 302 plays in an uninterrupted fashion. Also shown in FIG. 3 is on-off button 306 which, when selected, operates to cause the respective interactive videos to switch operations between interactive and otherwise static content. Also shown in FIG. 3 are a plurality of icons 308 (308A, 308B and 308C) that are formatted to include hyperlinks to additional content. For example icon 308B, when selected, causes instructions to be executed that results in content to be provided in the form of a map that identifies locations of respective dealers.

Figure 4:
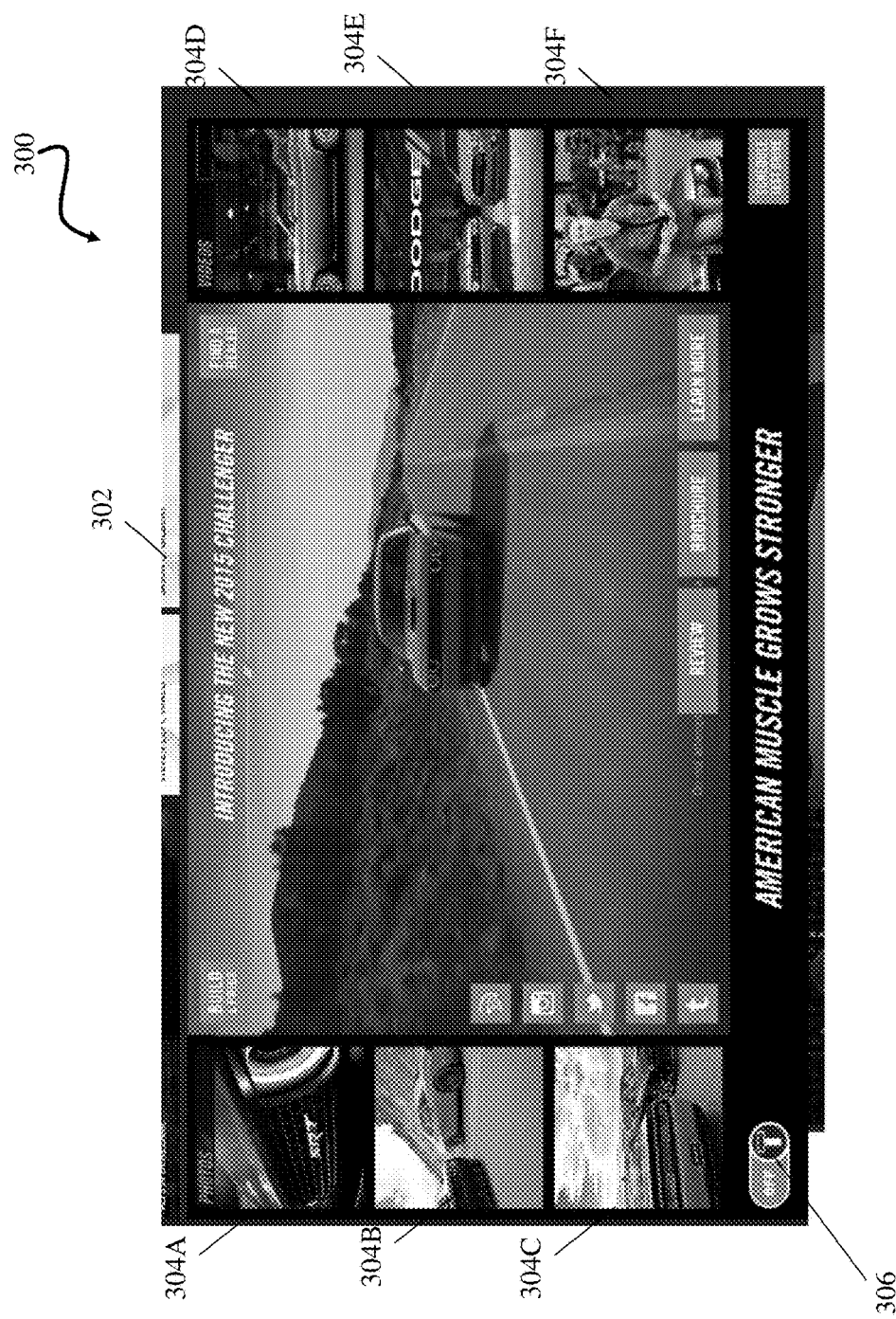
FIG. 4 illustrates an example coordinated presentation in which the content provided in respective display units plays, in connection with an example implementation.

FIG. 4 illustrates the example coordinated presentation 300 in which the respective content provided in portion 302 and display units 304A-F actively plays. As can be seen from a comparison with the coordinated presentation 300 shown in FIG. 3 and FIG. 4, each respective interactive video content is showing a different frame within the video. Each of the respective display units 304A-304F (e.g., vApps) is selectable and a selection, such as a click by user's mouse, results in instructions being executed to cause the interactive content in the respective display unit 304A-304F to "launch" and be provided to the respective user computing device in which the selection event occurred.

Figure 5:
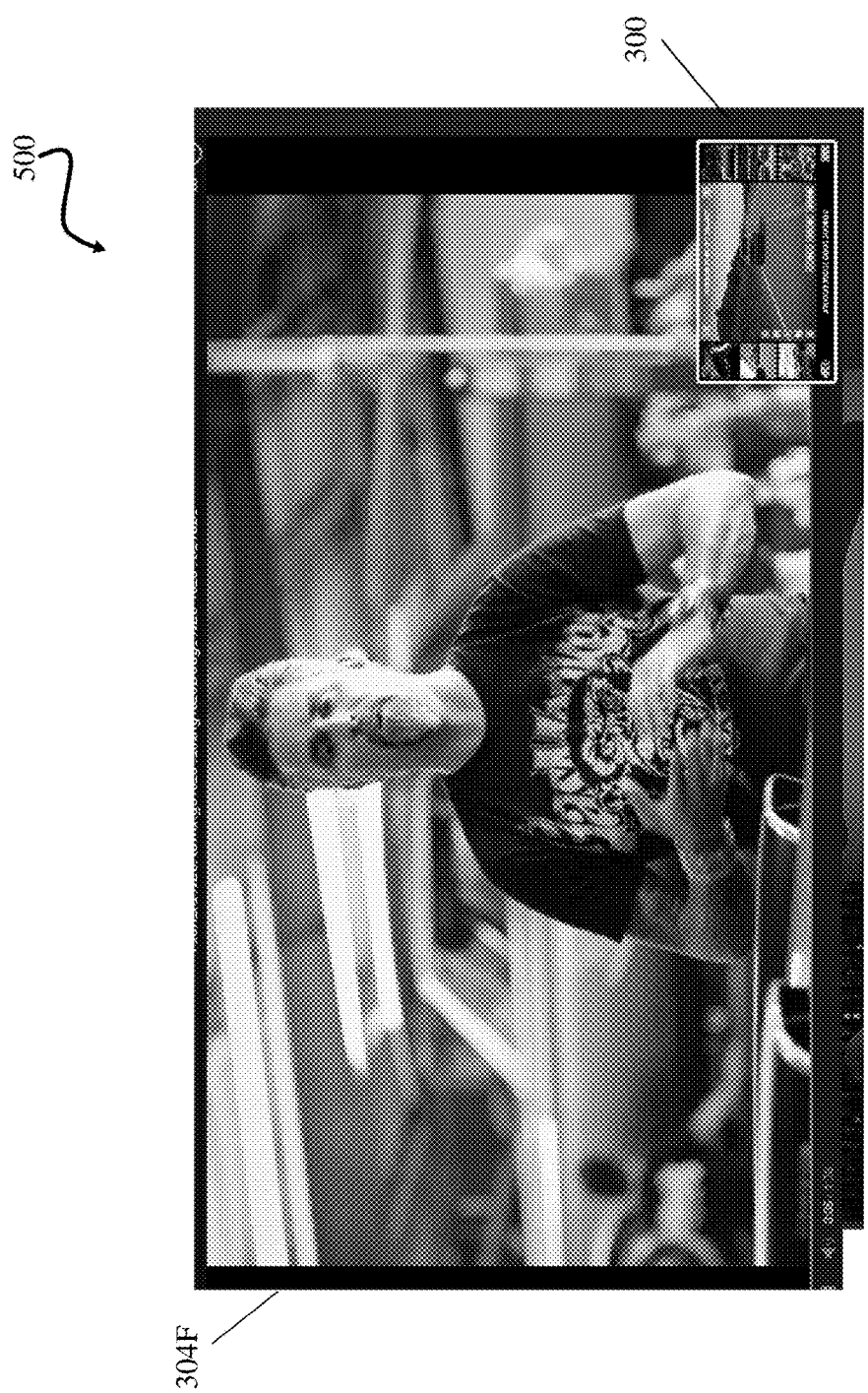
FIGS. 5 and 6 illustrate functionality represented in an example display screen in which one of the respective display units was selected by a user computing device, in connection with an example implementation.
Figure 6:
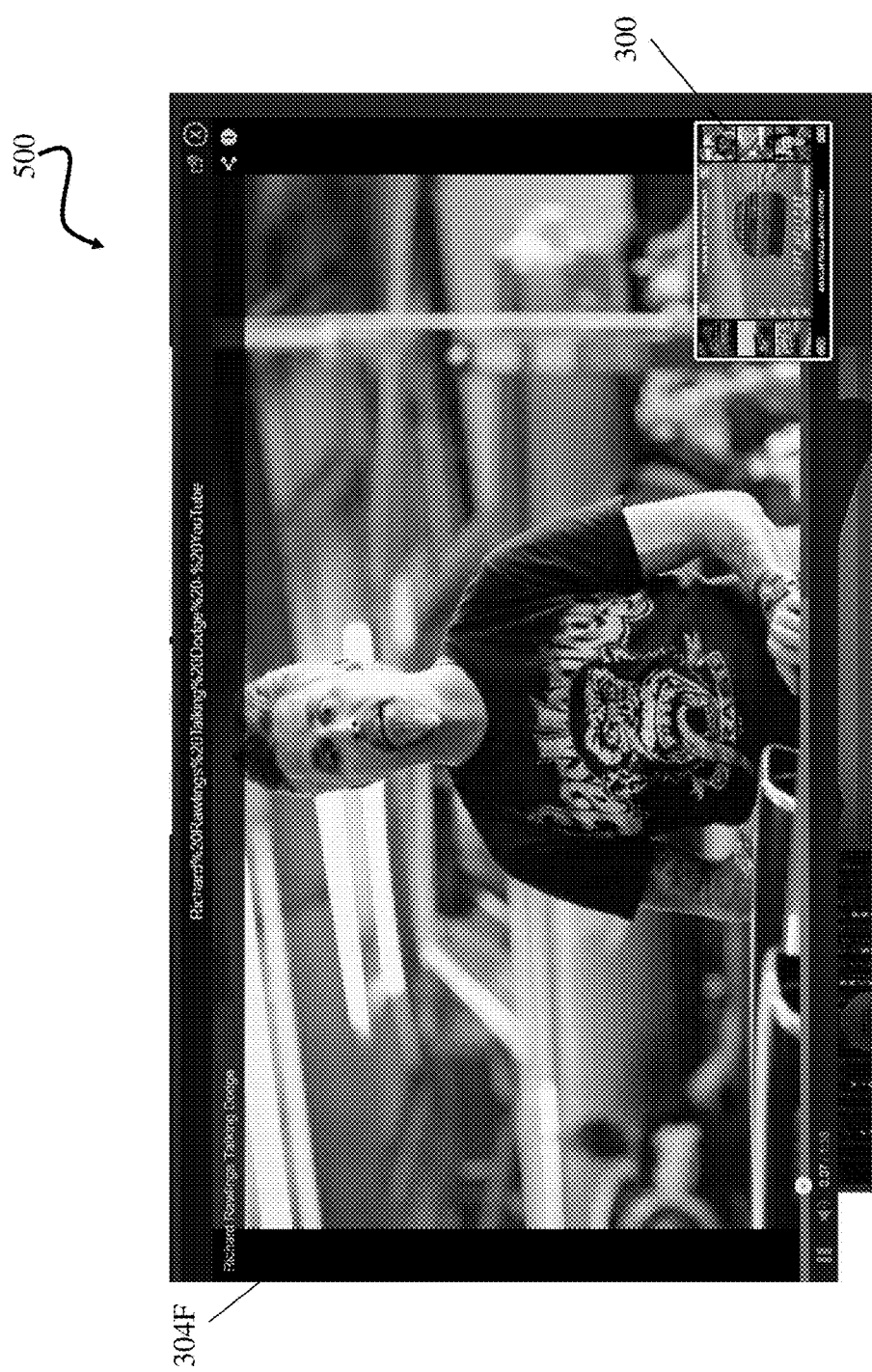

FIG. 5 illustrates an example display screen 500 in which one of the respective display units (in this case 304F) was selected by a user computing device. In the example implementation illustrated in FIG. 5, the interactive video content shown in corresponding display unit 304F is provided in a relatively full screen format, e.g., being rendered in an inner frame, an inline frame or other suitable element (collectively an "I-frame"). Thus, when a user selects a respective portion of coordinated presentation 300, such as display unit 304F, content is provided in an I-frame without the need to open another tab in the user's web browser software application, which would disrupt the user's experience with content the user was enjoying at the time of the selection.

Also as illustrated in FIG. 5, coordinated presentation 300 has been reduced in size and moved to the lower right-hand portion of the screen. As can be seen in comparison with the coordinated presentation 300 shown in the respective display portion in FIG. 4, the frame in FIG. 5 is virtually the same. In the implementation illustrated in FIGS. 5 and 6, the video content provided in the respective portions of the display 500 continue to play independently. This is demonstrated in the example display screen 400 shown in FIGS. 5 and 6, as the respective frames have changed due to the video playing in the respective portions. Upon selection of coordinated presentation 300 in FIG. 5 or 6, for example, coordinated presentation 300 and display unit 304F will modify and be represented substantially as shown in FIGS. 3 and 4. This demonstrates an example implementation of the present application in which a coordinated presentation 300 can be provided dynamically with respective display units 304.

Figure 7:
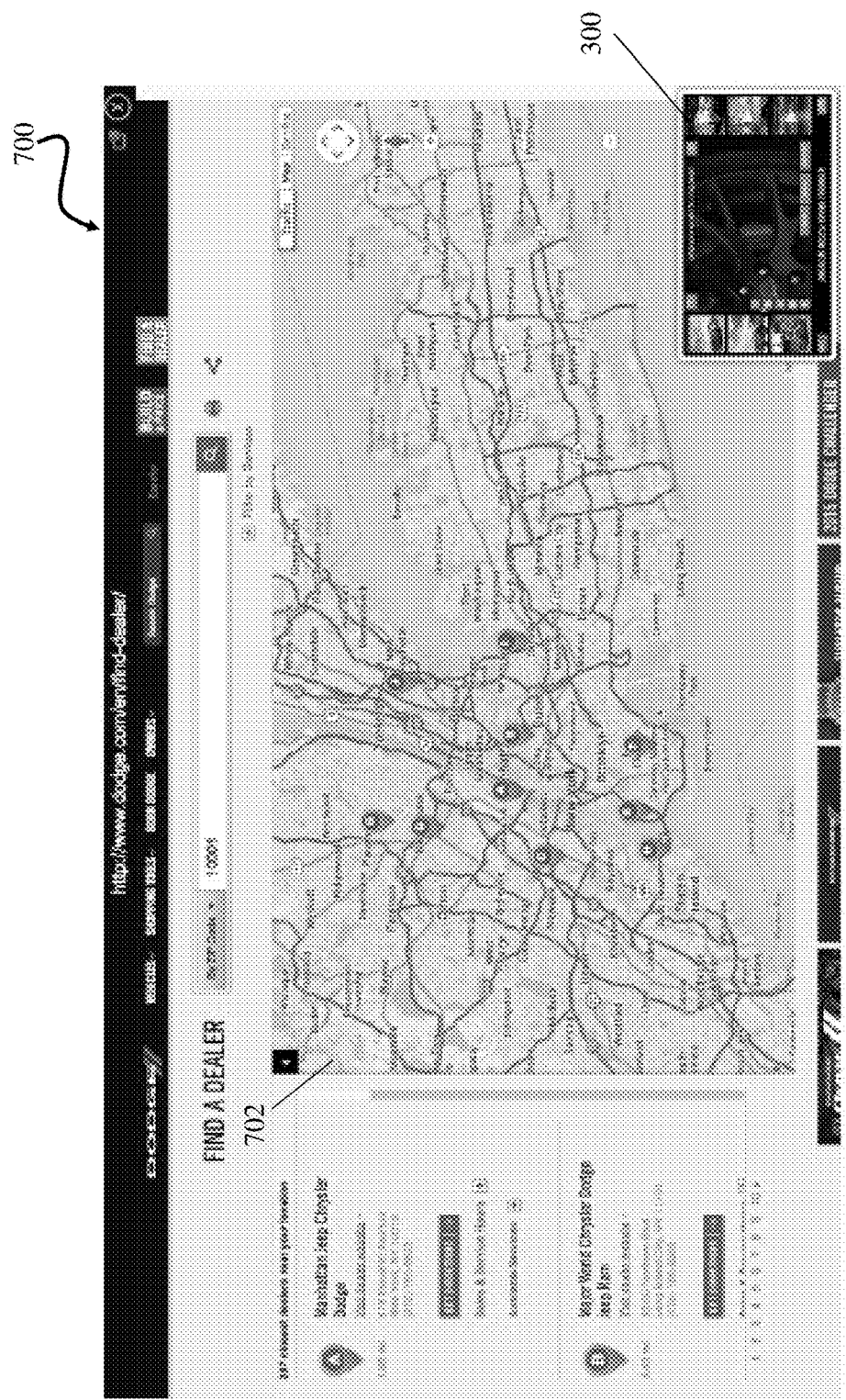
FIG. 7 illustrates another example implementation in which a user has selected an icon and a map is presented.

FIG. 7 illustrates another example implementation in which a user has selected icon 308B to find a dealer, and map 702 is presented in display screen 700. Further, and as shown and described above with regard to FIGS. 5 and 6, the coordinated presentation 300 has been reduced in size and moved to the lower right-hand portion of the screen. Thus and as shown in connection with the example implementation in the display 700, other content in addition to video content in connection with the present application, such as interactive maps, audio, text or other content can be provided as a function of coordinated presentation 300.

Figure 8:
FIG. 8 illustrates another example implementation in which a user has selected an icon to review news information associated with automobiles.

FIG. 8 illustrates another example implementation in which a user has selected icon 308B to review news information associated with automobiles, and newsletter 802 is presented in display screen 800.

Thus, as shown and described herein with reference to FIGS. 3-8, a coordinated presentation 300 can be provided with dynamic display units that provide content, including video content, without interrupting the user's interaction or consumption of content being presented at the time. In one or more implementations, the coordinated presentation 300 can be provided as a form of one or more ad units and a form of an advertising network can be served and/or maintained in accordance with the teachings herein. For example, advertisers can provide ad units that include a player tool and/or interactive content that is integrated in coordinated presentation 300. This provides a new and powerful advertising medium in which users can enjoy content, e.g., video, and be provided with interactive video or other advertising content without interruption of the video or other content they were enjoying.

Figure 9:
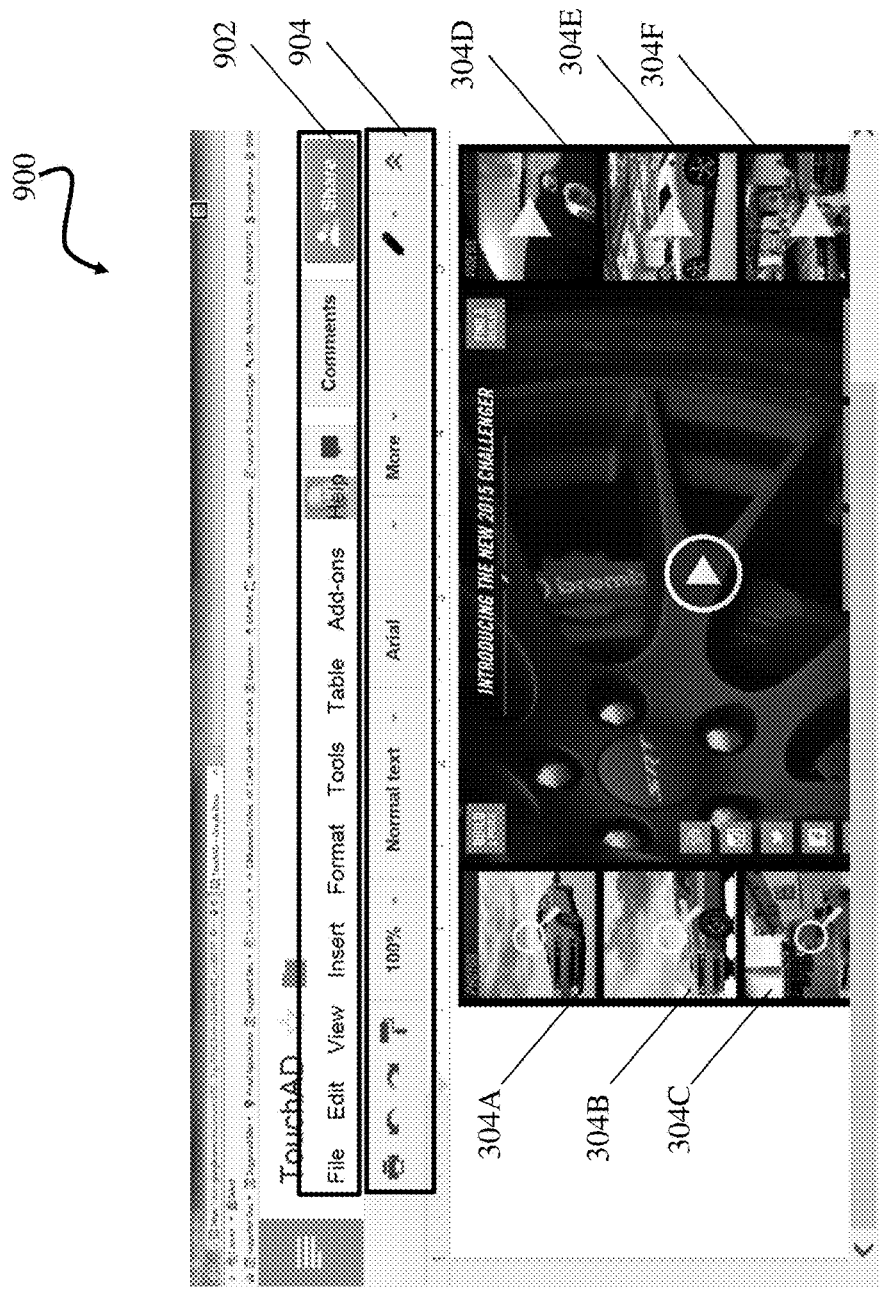
FIG. 9 illustrates a display screen that includes an example user interface that is usable to design and/or generate a coordinated presentation, in accordance with an implementation.

FIG. 9 illustrates a display screen 900 that includes an example user interface that is usable to design and/or generate a coordinated presentation 300 that includes respective components associated with a coordinated presentation 300, including configured as a TouchAd™. In the example implementation shown in FIG. 9, example menu bar 902 includes selectable commands and options that are associated with commands and/or additional menus for a user to create a new or access an existing coordinated presentation 300, editing options, insert options (e.g., for content to be added to a coordinated presentation 300, such as in one or more of a plurality of display units 304A-304F that can be independently controllable and that include interactive media content). Further, example options bar 904 is shown that includes graphical screen controls (e.g., icons, buttons, menu choices or the like) providing selectable options for printing, undoing/redoing editing, view percentage (shown as 100%), hypertext style (shown as "Normal Text"), font, and "More" options.

Thus, in one or more implementations of the present application, a form of an integrated development environment ("IDE") can be provided for authors to develop coordinated presentations 300, such as TouchAds™, that can be stored in one or more databases 103 and, thereafter delivered for integration in one or more Internet web pages in accordance with the teachings herein.

Figure 10:
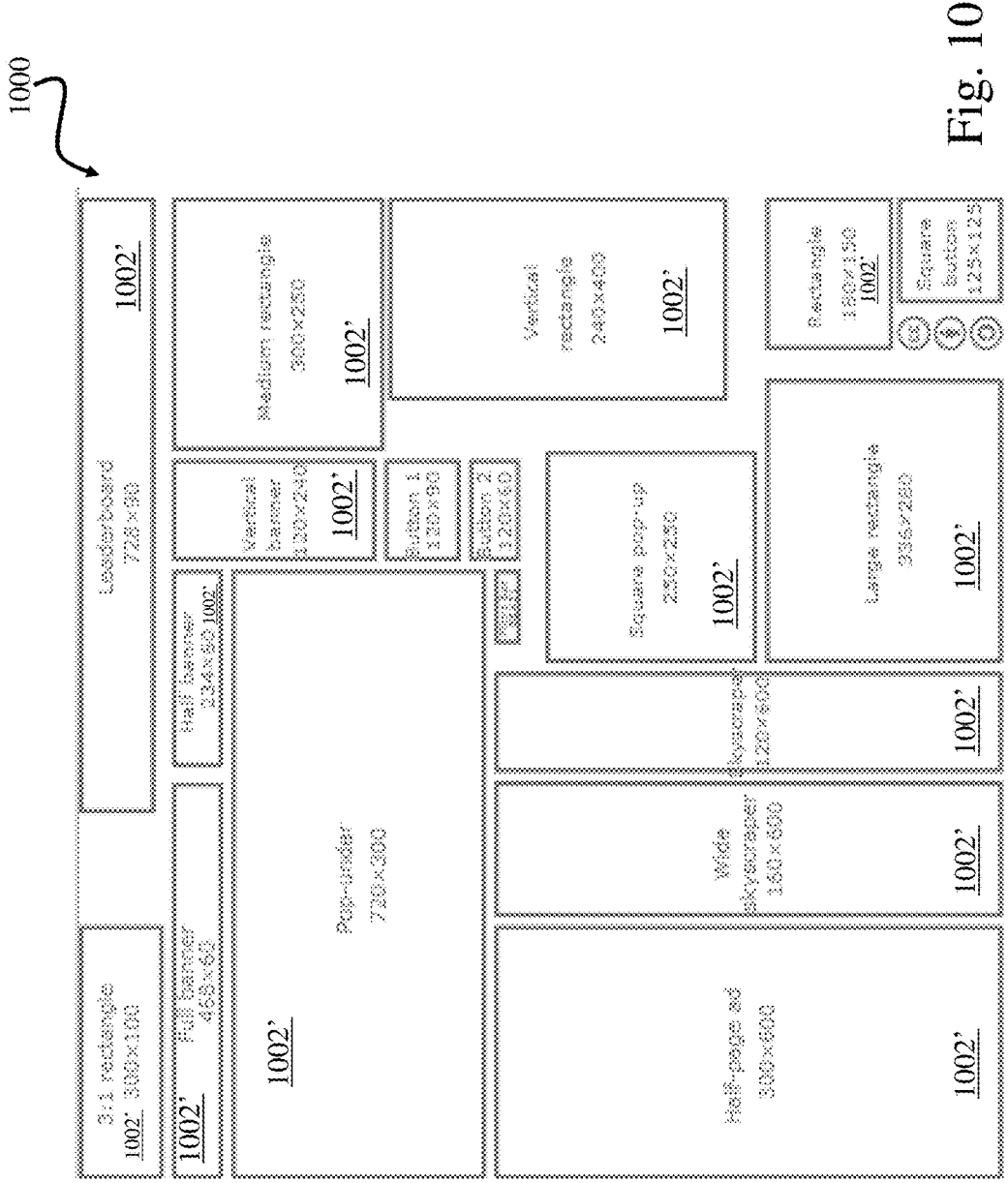
FIG. 10 illustrates example web browser display units and corresponding size dimensions in pixels.

One advantage of the present application regards improving the functionality of a computing device that is effectively free of being bound to a particular plug-in, protocol, display screen "real estate" or other limitations. FIG. 10 illustrates an example display screen 1000 with example web browser display units 1002' and corresponding size dimensions in pixels. The flexibility of coordinated presentation 300 and display units 304, including for ad units from respective advertisers, can support these and virtually any other dimensions a web site, web page or other application requires. Thus, any of the respective dimensions shown in FIG. 10 can be supported by display portion 302 and/or display unit 304.

In one or more implementations, the present application supports capturing information associated with a respective computing device in which coordinated presentation 300 is provided and a selection or other user based event occurs. For example, when a user selects display unit 304F, information associated with the selection event is generated and saved in one or more databases 103. The information may represent relative times and/or locations of the selection activity. For example, 35 seconds into a video playing in display unit 304F, a user clicks his mouse in the top right portion of display unit 304F. The information can be relative to the starting time of video content that corresponds to display unit 304F and/or the relative position of the display unit 304. As one or more selection events information associated with a plurality of computing devices are collected, metrics can be calculated that provide insights into the effectiveness of a coordinated presentation 300, including with regard to its respective content, layout, functionality, or the like. By knowing when and/or where activity occurs within a coordinated presentation 300 for a plurality of computing devices, various kinds of information, such as relating to trends and outliers, can be determined. In one or more implementations of the present application, information stored in one or more databases 103 can be accessed and processed by one or more data processing apparatuses 102 to alter or otherwise update a coordinated presentation 300 substantially automatically. A coordinated presentation 300 that is so altered by the data processing apparatus 102 can be distributed among a plurality of computing devices and as selection events occur in the altered coordinated presentation 300, additional metrics can be calculated to determine the effectiveness of the respective altered coordinated presentation 300. Additional alterations to coordinated presentations 300 can occur over time for continued refinement and improvement, and new coordinated presentations 300 can be developed and/or generated that reference directly or indirectly the previously calculated metrics.

In one or more implementations, the present patent application includes systems and methods for controlling one or more Internet websites, including websites that are provided by third parties, to provide a respective coordinated presentation 300 that includes one or more TouchAds™, dynamically. For example, one or more modules operate to cause the appearance of an Internet website to change such that the website appears to be pushed down within display 220, thereby making available one or more display units 1002' appear in the respective coordinated presentation 300. Referred to herein, generally, as "air rights," content that is set forth in the upper most portion of display screen 1000, e.g., an Internet web page, is replaced by other interactive content herein and the Internet web page is effectively redrawn there-below.

Accordingly, the present application supports functionality associated with mapping, and enabling one or more graphical templates that can relate and/or interact with each other to take over a portion of content, such as an Internet web page, that is provided in a display 1000. In one or more implementations, a triggering event is detected by data processing apparatus and/or user computing device 104 and, in response, data processing apparatus 102 or user computing device 104 executes instructions that configure the device to replace content displayed can be based on various factors, such as the content of the website being viewed, information associated with the person viewing the website, the technical implementation of the website, advertiser and/or advertisement-related information, and time/date information. Data processing apparatus 102 and/or user computing device 104 can select the respective content (e.g., a coordinated presentation 300 configured as a TouchAd™) to be provided in the air rights space based on these or other factors. Thus, a data payload can be processed by data processing apparatus 102 and/or user computing device 104 to determine when and how to implement functionality shown and described herein, including associated with one or more coordinated presentations 300 is to be configured as one or more coordinated presentations 300, for example, configured as TouchAds™.

The present application provides for one or more takeover operations that function to reposition website content from a respective location on a display screen, e.g., in one or more display units, and to insert a respective coordinated presentation 300, one or more vApps or similar content and functionality, in its place. In one or more implementations of the present application, one or more "snippets" of code can be added to an Internet website including a pre-existing website, that includes instructions for causing a processor to reposition content in the manner shown and described herein. The present application supports the use of tags, as known in the art, and a respective tag such as referred to herein as a TouchAd™ Tag, can be added to the programming source code of an Internet website to provide functionality associated with securing air rights and providing a coordinated presentation 300 therein. Moreover, data associated with the website, the viewer and/or the viewer's computing device (including software) can be analyzed substantially in real time to provide customized content, such as coordinated presentations 300, for example, configured as TouchAds™, that are customized to a website visitor's demographics, preferences or other characteristics.

In an example implementation, a data communication session is established between a hypertext transport protocol ("HTTP") server and a web browser operating on a user computing device 104. As content associated with the website is received and displayed in the browser, a call can be made to another computing device, such as a server computer that provides advertising (e.g., coordinated presentation 300, for example, configured as TouchAd™) content. Included in the call can be information associated with the viewer, the viewer's computing device, software on the viewer's computing device, or other useful information for selecting and providing particular content, such as in the "air rights" section of a web site. One or more advertising campaign as associated with particular content, days and times can be referenced by data processing apparatus 102 and/or user computing device 104 and presented in the web browser accordance with the teachings herein in a timely and useful way. Further, as users interact with an Internet web page (and/or a coordinated presentation 300, for example, configured as TouchAd™, vApp or other content), particular content can be selected and provided dynamically.

Figure 11:
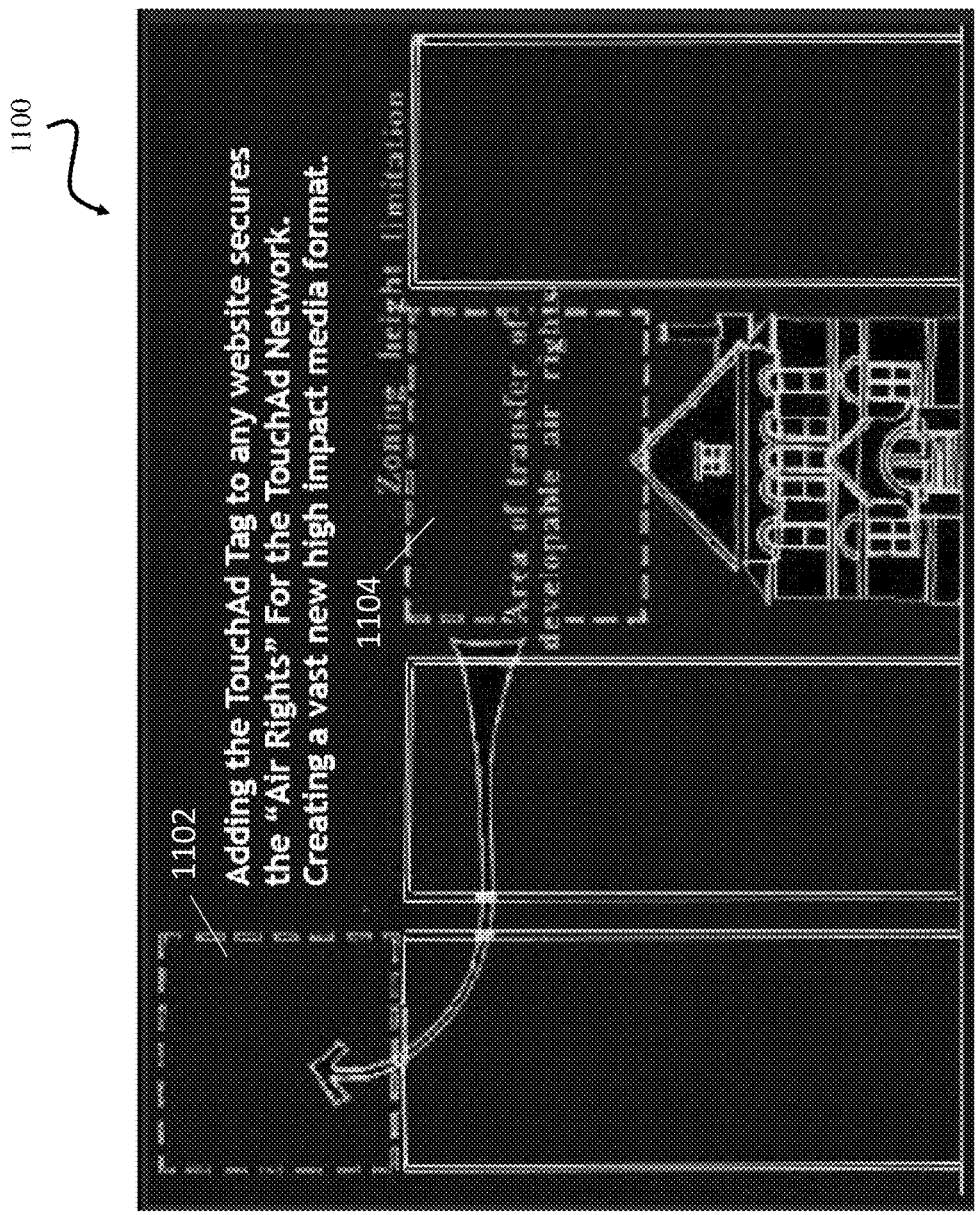
FIG. 11 illustrates web browser display units and represents functionality associated with securing "air rights" to a web page, in connection with an example implementation.

FIG. 11 is a simple block diagram that illustrates display units 1002' in an example Internet web page 1100. For example and as illustrated in FIG. 11, an Internet web page that is configured with a snippet of code (e.g., a TouchAd™ Tag) enables the content provided in the area 1102 to be transferred to a different location 1104 and which can support a coordinated presentation 300, such as a TouchAd™, in the newly located area 1102.

Figure 12A:
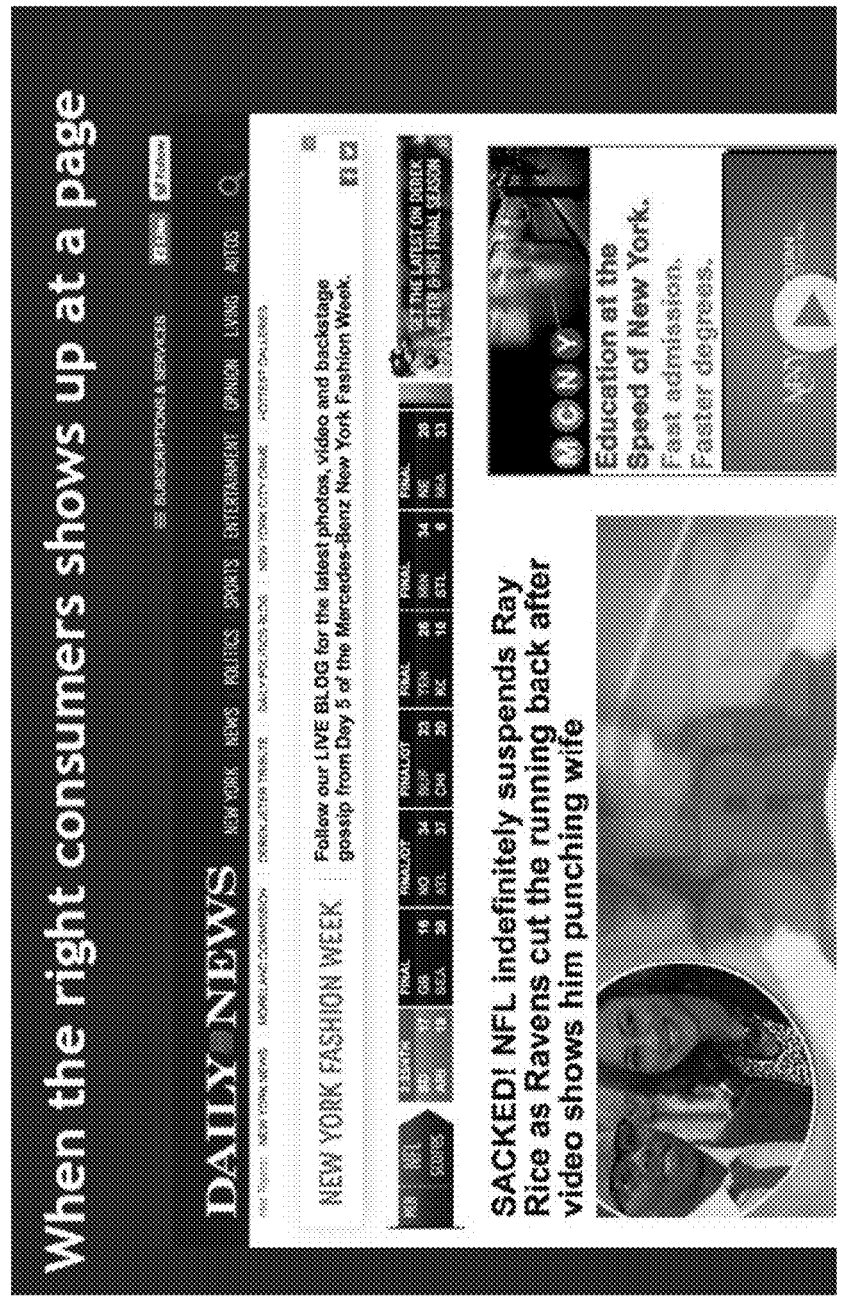
FIGS. 12A and 12B illustrate an example Internet web site that is configured for securing air rights and providing a coordinated presentation therein, in connection with an example implementation.
Figure 12B:
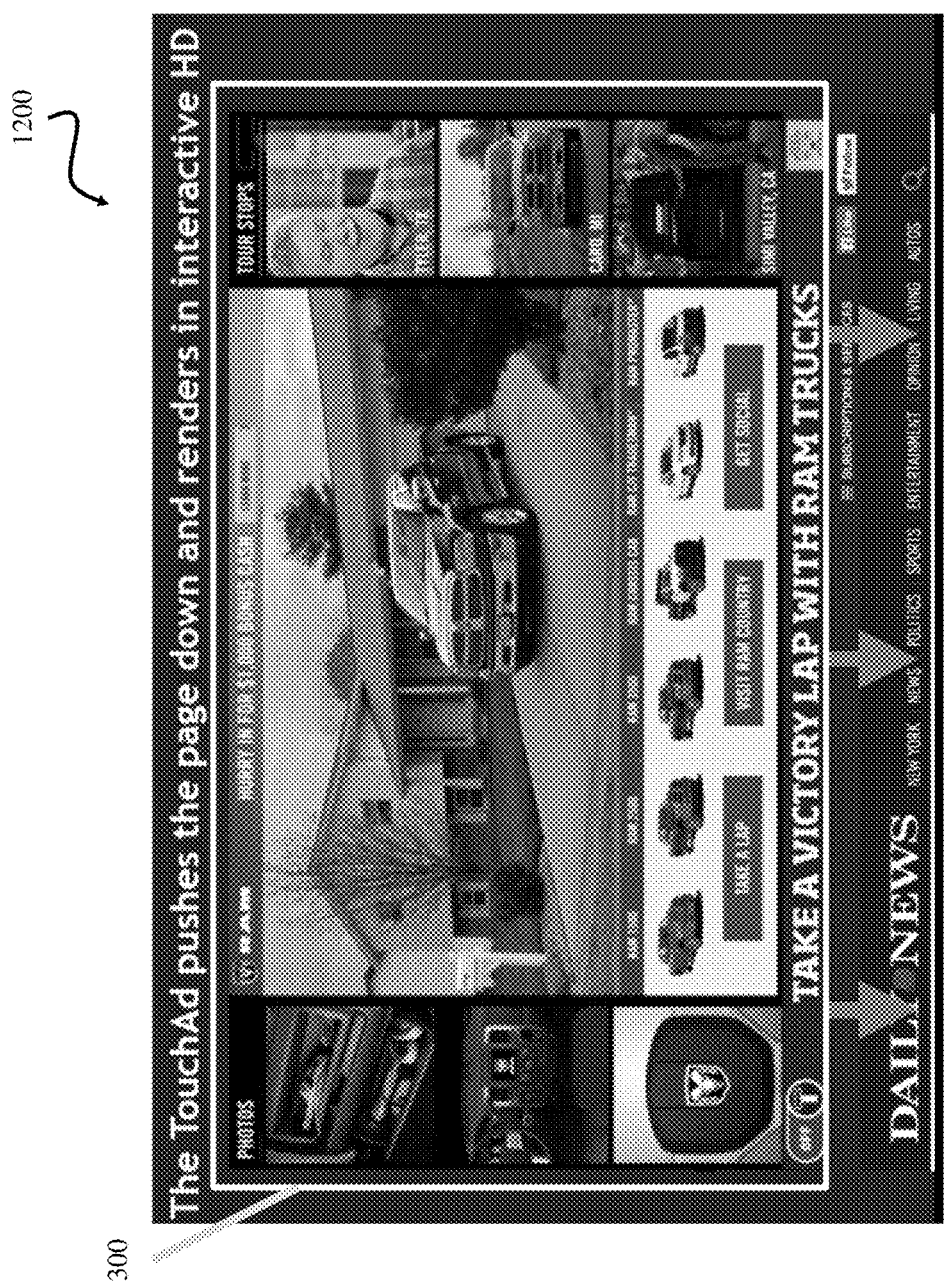

For example, and as illustrated in FIGS. 12A and 12B, an example Internet web page 1200 ("Daily News") is configured for securing air rights and providing a coordinated presentation 300 therein. In the example shown in FIGS. 12A and 12B, a determination is made about the particular visitor(s) (or a consumer(s)) of the page and when a suitable consumer connects to the site instructions are processed to remove the webpage from the "air rights" section, and replace it with the coordinated presentation 300 in its place shown (at the top of the page). The web page content is provided at a new display unit 1002' (e.g., in a location). Substantially as shown in FIG. 12B, the visual effect is that the respective coordinated presentation 300 appears to push the webpage down, and renders interactive high definition (HD) video in the web page's place.

Figure 13:
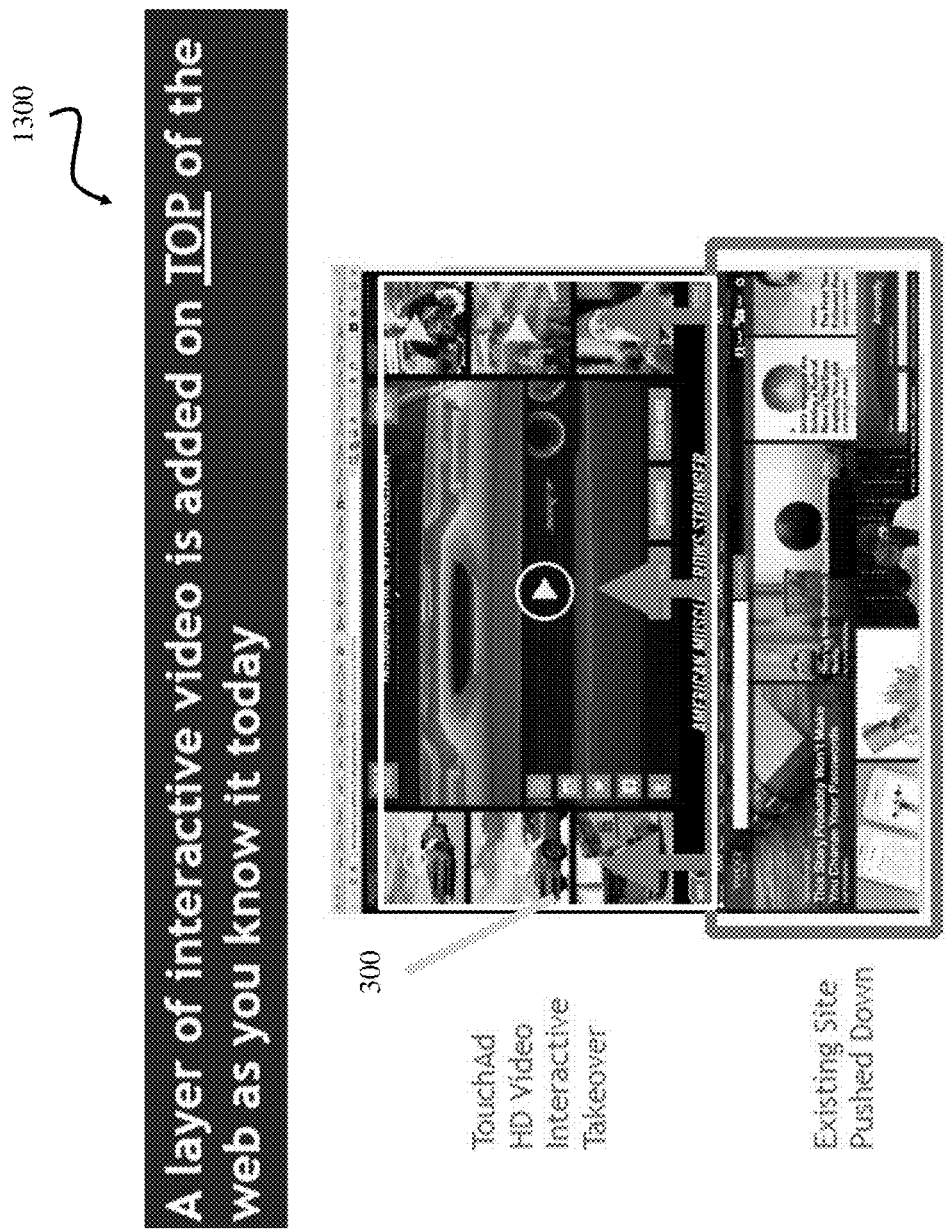
FIG. 13 displays an example web site page that illustrates a layer of interactive video (a respective coordinated presentation), which is provided on top of the web site page, in connection with an example implementation.

Another example web page illustrating a coordinated presentation 300 added to the top of a web site page and an existing web page having been "pushed" down to accommodate the space required for the coordinated presentation 300 is shown in FIG. 13. FIG. 13 displays an example web site page 1300 that illustrates a layer of interactive video (a respective coordinated presentation 300), which is provided on top of the web site page 1300.

Figure 14:
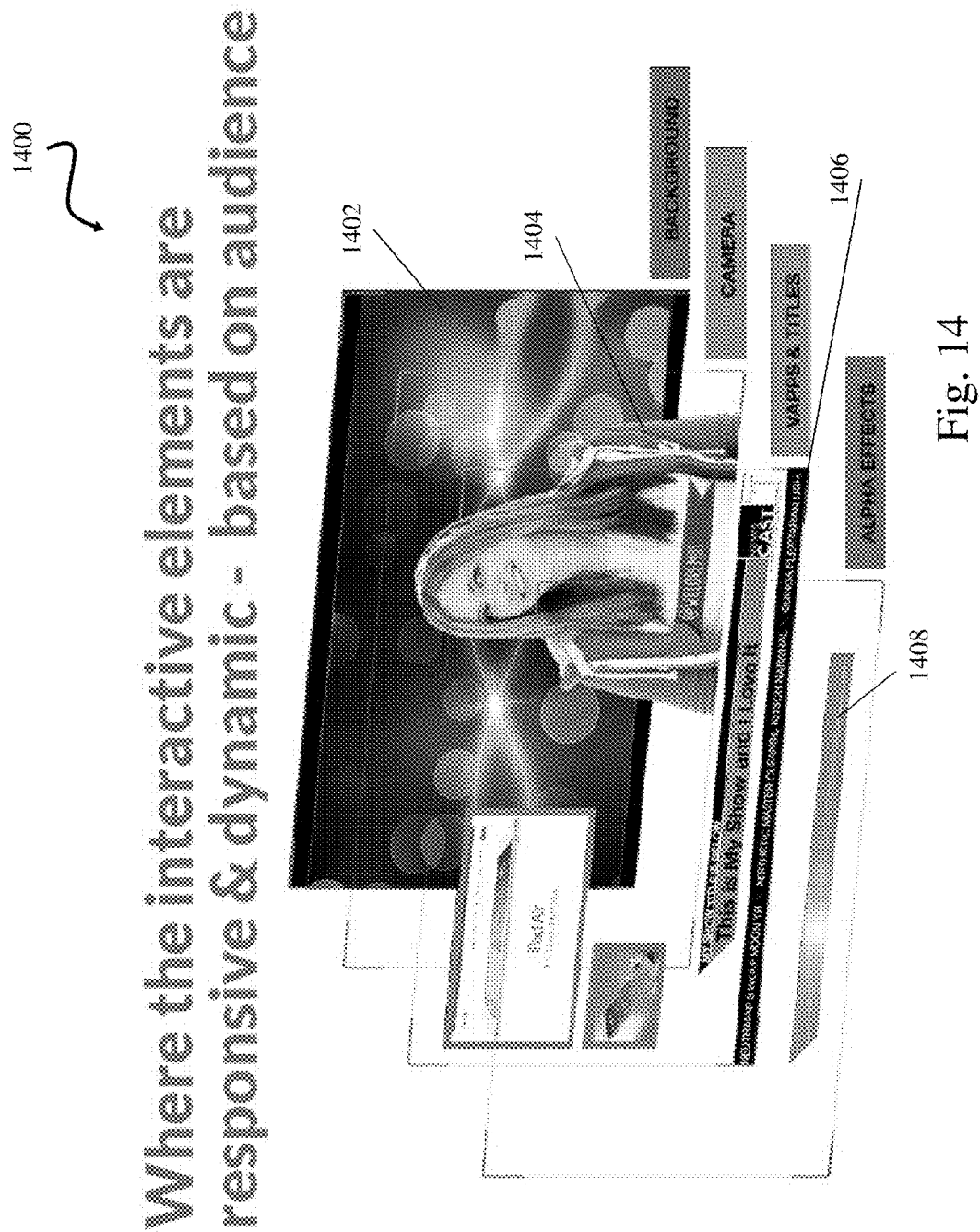
FIG. 14 illustrates an example display screen showing an exploded view of interactive elements included in a coordinated presentation, in connection with an example implementation.

FIG. 14 illustrates an example display screen 1400 showing an exploded view of interactive elements included in a coordinated presentation 300 in connection with an example implementation. The respective elements associated with the example coordinated presentation 300 include a background element 1402, which can be a splash screen, an image or other graphical content. Further content element 1404 can include one or more images captured from a camera, vApps and titles element 1406 provide additional and optionally interactive content. Also included are alpha channel effects 1408 that can be applied for improving the appearance and behavior of content within display screen 1400. The various components set forth in display screen 1400 provide for flexible organization and positioning of interactive elements 1402, 1404, 1406 and 1408, which can be responsive and dynamic and respectively selected, for example, based on a determination of data processing apparatus 102 and/or user computing device 104 of a particular audience and/or user. For example, as a computing device 104 associated with the user establishes a data communication with a respective server, a coordinated presentation 300 appears dynamically, such as in response to an action taken by the user or automatically, at the top of the display (e.g., display screen 1400), thereby "securing air rights" and information associated with the user and/or the computing device 104 can be ascertained, and the interactive elements can be selected and positioned in a way that is most suitable for that individual user.

Figure 15:
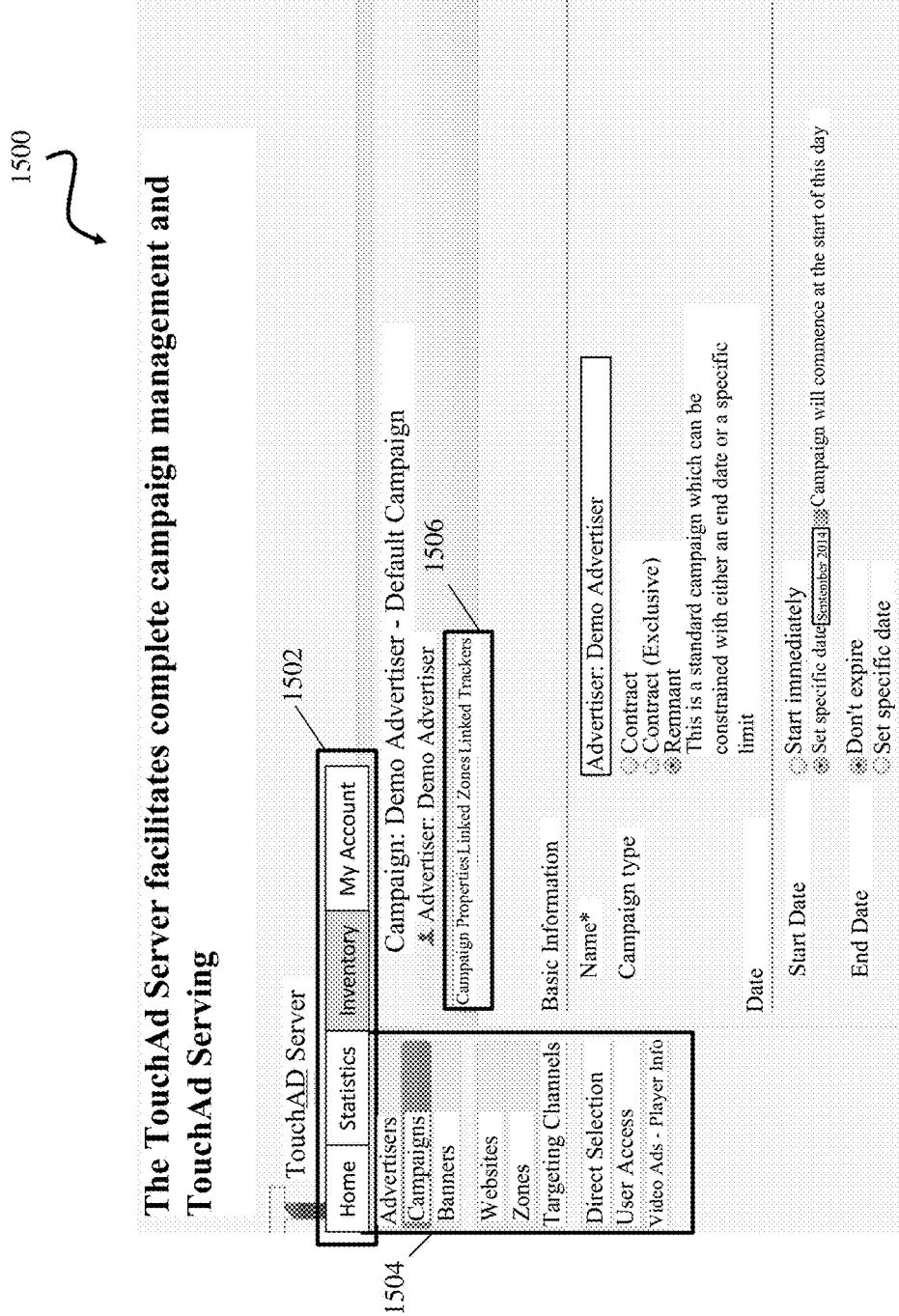
FIG. 15 illustrates an example display screen that is usable for campaign management and serving coordinated presentations, in accordance with present application.

FIG. 15 illustrates an example display screen 1500 provided, for example, via data processing apparatus 102 and/or user computing device 104 which may be configured as a server computer, and that is usable for campaign management and serving coordinated presentations 300 in accordance with an example implementation of the present application. In the example display screen 1500 shown in FIG. 15, tabs 1502 include selectable options that are available for a user to select statistics, inventory, and account information for managing a particular advertising campaign associated with one or more coordinated presentations 300. In the example shown in FIG. 15, a respective one of the tabs associated with inventory has been selected by the user. Further, display screen 1500 includes other selectable options 1504 for obtaining and defining information associated with advertisers, campaigns, banners, websites, zones, targeting channels, direct selection, user accounts and video ads—player information. In the example shown in FIG. 15, a selection has been made among options 1504 for defining a new campaign (e.g., a TouchAd™ campaign). In addition, selectable tabs 1506 are provided to enter campaign properties, link designs and linked trackers, with campaign properties being presently selected and corresponding selectable options being represented in the body portion of display screen 1500. For example, options for entering basic information associated with the name and type of campaign, as well as for defining starting and ending dates of the campaign are provided in display screen 1500 for the user. Thus, as shown and described in the example display screen 1500, the present application affords functionality and flexibility for users to define advertising campaigns that employ coordinated presentations 300, including TouchAds™.

Figure 16:
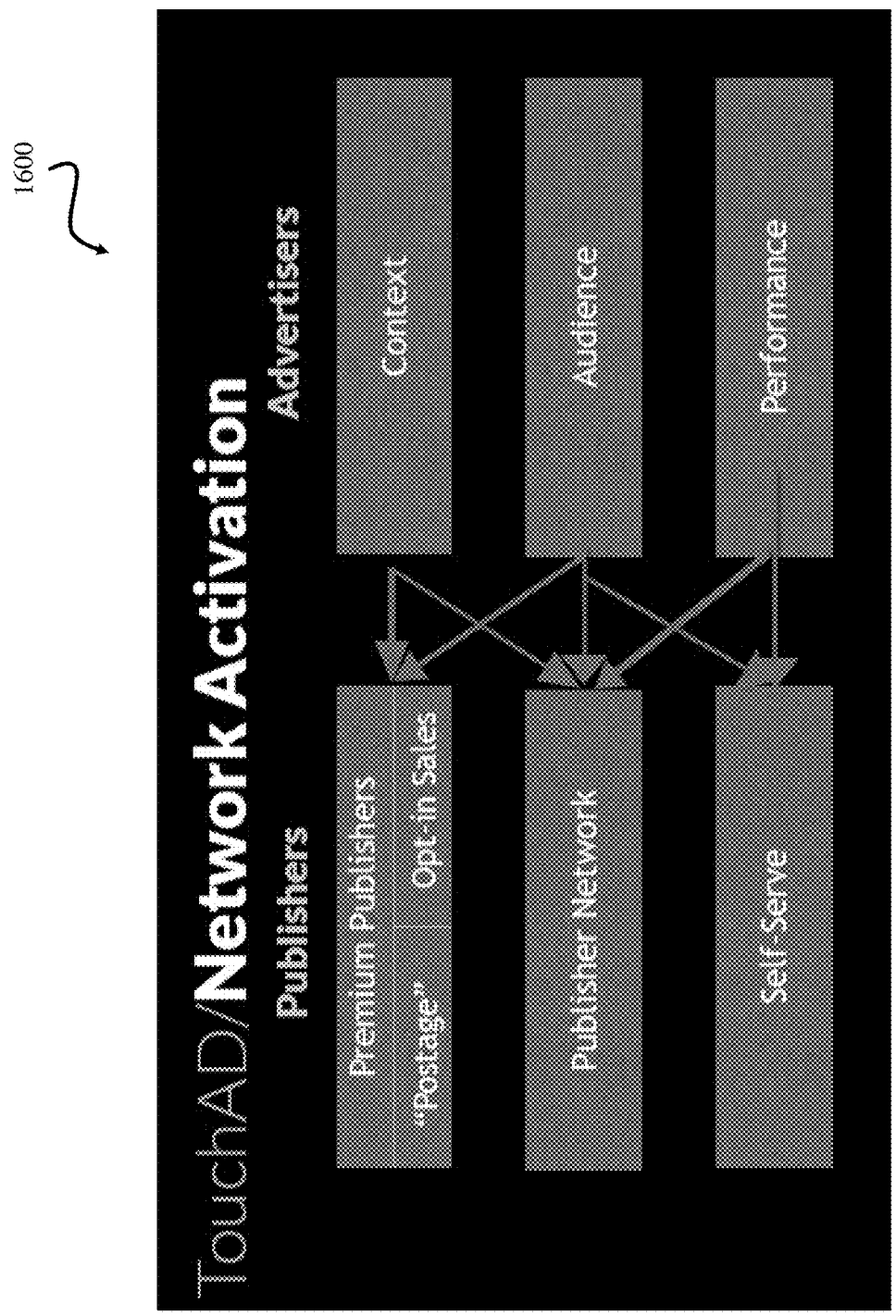
FIG. 16 is a block diagram that illustrates components associated with network activation, and include computing devices and content associated with publishers and advertisers, in accordance with an example implementation of the present application.

The present application further supports an ability for publishers and advertisers to participate in an active advertising network, which can be provided via a proprietor of one or more implementations of the present application. FIG. 16 is a block diagram 1600 that illustrates components associated with network activation, and include computing devices and content associated with publishers and advertisers, in accordance with an example implementation of the present application. Advertiser categories are broadly represented to include "context," "audience" and "performance." Example categories associated with publishers are broadly represented in FIG. 16 as "premium publishers," "publisher network" and "self-serve," which are usable to select respective publishers. Data values that are associated with the respective categories are usable, for example, to select stored information associated with one or more coordinated presentations 300, including TouchAds™. Thus, the respective advertiser categories represent criteria that can be processed to determine at least respective publishers. Example categories associated with advertisers are broadly represented in FIG. 16 as "context," "audience" and "performance," which represent information provided by advertisers to be processed in connection with selecting publishers and/or content to for a respective campaign, such as selection and/or generation of respective TouchAds™ to be provided via one or more respective publishers.

The advertising network associated with the present application, as well as the particular functionality and implementations shown and described herein, operate to increase user interaction rates many times over compared to traditional Internet advertisements. For example, a coordinated presentation 300 (e.g., configured as a TouchAd™), can result in significantly higher viewer engagement then video annotations, such as known in the art. Such improved user engagement can include increased click-through rates and higher conversion rates over traditional Internet advertisements, and can occur as a function of features provided in the present patent application. A coordinated presentation 300, for example, configured as a TouchAd™, provides for significantly higher viewer engagement then mere video annotations that are configured with static hyperlinks.

Figure 17:
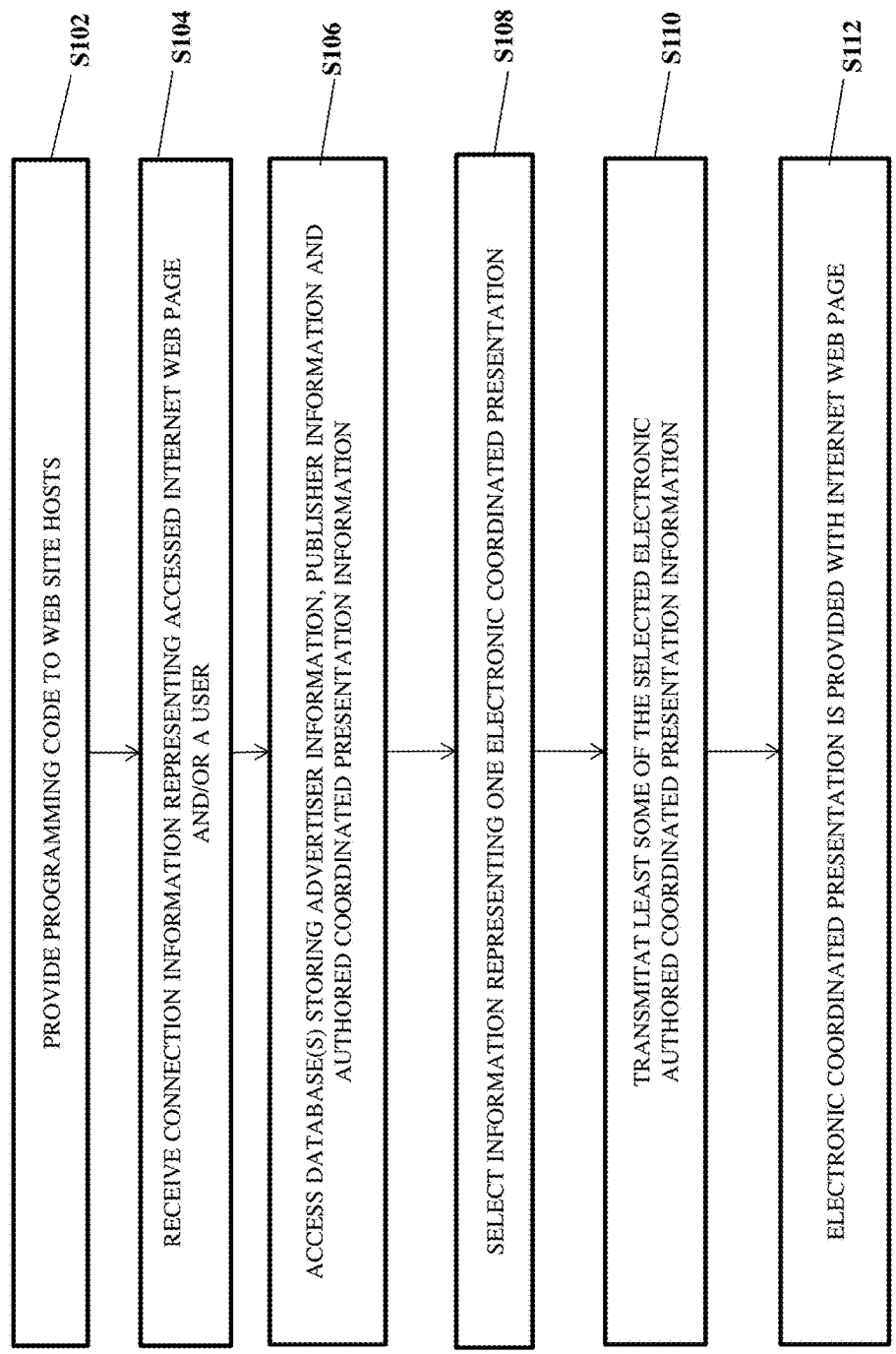
FIG. 17 is a flowchart illustrating example steps associated with an example implementation of the present application.

FIG. 17 is a flowchart illustrating example steps S100 associated with an implementation of the present application. It is to be appreciated that the steps described herein have been indicated for facilitating a description of example processes of an illustrated embodiment of the invention; however, certain blocks can be invoked in an arbitrary order, such as when the events drive the program flow such as in an object-oriented program. Accordingly, the flow diagram is to be understood as an example flow and that the blocks can be invoked in a different order than as illustrated.

With further reference to FIG. 17, a system and method provide a selectable and integrable media format within an Internet web page. At least some programming code is provided by at least one processor to each of a plurality of computing devices that are configured as Internet web site hosts, and that integrate the at least some programming code as source code of a plurality of Internet web pages (step S102). In response to at least one computing device executing the at least some programming code by establishing a connection with at least one of the Internet web pages, electronic connection information is received by the at least one processor (step S104). The electronic connection information represents the at least one of the Internet web pages and/or a user of the at least one computing device executing the at least some programming code.

Moreover, in one or more implementations, the at least one processor accesses at least one database 103 (step S106). The at least one database 103 includes electronic advertiser information that represents at least one of context of advertising content, audience criteria and advertising performance. The at least one database 103 further includes electronic publisher information that represents at least one of a premium publisher, a publisher network, and self-serve publishing. The at least one database 103 further includes electronic authored coordinated presentation information that is associated with a plurality of electronic coordinated presentations. Each of the electronic coordinated presentations comprises at least a first display portion configured to play first video content and a plurality of display units that each provide a link to other respective video content, wherein selection of any of the links in the display units results in corresponding video to play in the respective display unit while the first video content continues to play.

Further, in one or more implementations, the at least one processor selects, at least as a function of at least one of i) the received electronic connection information, ii) the electronic advertiser information and iii) the electronic publisher information, at least some of the electronic authored coordinated presentation information representing one of the electronic coordinated presentations (step S108). The at least one processor transmits to the at least one computing device executing the at least some programming code and/or another computing device, at least some of the selected electronic authored coordinated presentation information (step S110). The transmitted electronic authored coordinated presentation information is usable to provide the one of the electronic coordinated presentations with the at least one Internet web page on the at least one computing device executing the at least some programming code (step S112).

Thus, the present application provides significant flexibility and creativity in connection with creating and viewing coordinated presentations. Although many of the examples shown and described herein regard distribution of coordinated presentations to a plurality of users, the invention is not so limited. Although illustrated embodiments of the present invention have been shown and described, it should be understood that various changes, substitutions, and alterations can be made by one of ordinary skill in the art without departing from the scope of the present invention.

What is claimed is:

1. A method for providing a selectable and integrable media format within an Internet web page, the method comprising:
   providing, by at least one processor that is operably coupled to a communication network, programming code to be injected by each of a plurality of Internet web site hosts into each of a plurality of hosted pre-existing Internet web sites;
   receiving, by the at least one processor and in response to a user computing device connecting to one of the pre-existing Internet web sites with the injected programming code, electronic connection information representing the one of the pre-existing Internet web sites and a user of the user computing device executing the at least some programming code;
   accessing, by the at least one processor, at least one database that includes:
      electronic advertiser information that represents at least one of advertising content, audience criteria and advertising performance; and
      electronic authored coordinated presentation information that is associated with a plurality of electronic coordinated presentations that each comprise a display portion configured to play video content;
   selecting, by the at least one processor and at least in accordance with at least i) the received electronic connection information and ii) at least some of the electronic advertiser information, at least some of the electronic authored coordinated presentation information representing one of the electronic coordinated presentations; and
   transmitting, by the at least one processor to the at least one computing device executing the at least some programming code, the selected electronic authored coordinated presentation information,
   wherein the selected electronic authored coordinated presentation information is usable to provide on the user computing device at least one of the electronic coordinated presentations in a container, wherein the container is separate and distinct from the one of the pre-existing Internet web sites, and
   further wherein, when the transmitted electronic authored coordinated presentation information is received by the user computing device and the injected programming code is executed by the user computing device, i) the one of the pre-existing Internet web sites is replaced on the user computing device by the container, and ii) the one of the pre-existing Internet web sites is provided on the user computing device at a location offset from the container.

2. The method of claim 1, wherein prior to transmitting the at least some of the selected electronic authored coordinated presentation information, the at least one Internet web page is displayed in a first location on the at least one computing device executing the at least some programming code, and is automatically at least partially replaced with the one of the electronic coordinated presentations.

3. The method of claim 2, wherein the at least one Internet web page is automatically provided at a position below the one of the electronic coordinated presentations.

4. The method of claim 1, wherein selecting at least some of the electronic authored coordinated presentation information is further based on at least a user of the at least one computing device executing the at least some programming code.

5. The method of claim 1, further comprising:
   providing, by the at least one processor in response to receiving information associated with advertising, electronic campaign information representing with an advertising campaign; and
   storing, by the at least one processor in the at least one database, the electronic campaign information.

6. The method of claim 5, wherein selecting at least some of the electronic authored coordinated presentation information is further based on at least some of the electronic campaign information.

7. The method of claim 5, further comprising providing, by the at least one processor, options in the campaign management interface to identify websites for receiving at least one of the coordinated presentations, zones and targeting channels.

8. The method of claim 5, wherein the campaign management interface includes options to define constraints including at least one of a starting date and an ending date.

9. The method of claim 1, wherein at least one of the coordinated presentations includes a plurality of components that include a background, images provided by a camera, video applications ("vApps"), and alpha effects.

10. A system for providing a selectable and integrable media format within an Internet web page, the system comprising:
    at least one processor readable media;
    at least one processors operatively coupled to the at least one processor readable media;
    the at least one processor readable media having instructions for causing the following steps to be performed by the at least one processor:
       provide programming code to be injected by each of a plurality of Internet web site hosts into each of a plurality of hosted pre-existing Internet web sites;
       receive, in response to a user computing device connecting to one of the pre-existing Internet web sites with the injected programming code, electronic connection information representing the one of the pre-existing Internet web sites and a user of the user computing device executing the at least some programming code;
       access at least one database that includes:
          electronic advertiser information that represents at least one of advertising content, audience criteria and advertising performance; and
          electronic authored coordinated presentation information that is associated with a plurality of electronic coordinated presentations that each comprise a display portion configured to play video content;
       select at least in accordance with at least i) the received electronic connection information and ii) at least some of the electronic advertiser information, at least some of the electronic authored coordinated presentation information representing one of the electronic coordinated presentations; and transmit to the at least one computing device executing the at least some programming code, the selected electronic authored coordinated presentation information, wherein the selected electronic authored coordinated presentation information is usable to provide on the user computing device at least one of the electronic coordinated presentations in a container, wherein the container is separate and distinct from the one of the pre-existing Internet web sites, and further wherein, when the transmitted electronic authored coordinated presentation information is received by the user computing device and the injected programming code is executed by the user computing device, i) the one of the pre-existing Internet web sites is replaced on the user computing device by the container, and ii) the one of the pre-existing Internet web sites is provided on the user computing device at a location offset from the container.

11. The system of claim 10, wherein prior to the step of transmitting the at least some of the selected electronic authored coordinated presentation information, the at least one Internet web page is displayed in a first location on the at least one computing device executing the at least some programming code, and is automatically at least partially replaced with the one of the electronic coordinated presentations.

12. The system of claim 11, wherein the at least one Internet web page is automatically provided at a position below the one of the electronic coordinated presentations.

13. The system of claim 10, wherein the step of selecting at least some of the electronic authored coordinated presentation information is further based on at least a user of the at least one computing device executing the at least some programming code.

14. The system of claim 10, wherein the at least one processor readable media further have instructions for causing the following steps to be performed by the at least one processors:

provide in response to receiving information associated with advertising, electronic campaign information representing with an advertising campaign; and store in the at least one database, the electronic campaign information.

15. The system of claim 14, wherein the step of selecting at least some of the electronic authored coordinated presentation information is further based on at least some of the electronic campaign information.

16. The system of claim 14, wherein the at least one processor readable media further have instructions for causing the following steps to be performed by the at least one processors:

provide options in the campaign management interface to identify websites for receiving at least one of the coordinated presentations, zones and targeting channels.

17. The system of claim 14, wherein the campaign management interface includes options to define constraints including at least one of a starting date and an ending date.

18. The system of claim 10, wherein at least one of the coordinated presentations includes a plurality of components that include a background, images provided by a camera, video applications ("vApps"), and alpha effects.

* * * * *